(12) United States Patent
Rothwell et al.

(10) Patent No.: US 10,504,522 B2
(45) Date of Patent: *Dec. 10, 2019

(54) SYSTEM AND METHOD FOR VALIDATING NATURAL LANGUAGE CONTENT USING CROWDSOURCED VALIDATION JOBS

(71) Applicant: VOICEBOX TECHNOLOGIES CORPORATION, Bellevue, WA (US)

(72) Inventors: Spencer John Rothwell, Seattle, WA (US); Daniela Braga, Bellevue, WA (US); Ahmad Khamis Elshenawy, Lynnwood, WA (US); Stephen Steele Carter, Seattle, WA (US)

(73) Assignee: Voicebox Technologies Corporation, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/924,863

(22) Filed: Mar. 19, 2018

(65) Prior Publication Data

US 2018/0277118 A1 Sep. 27, 2018

Related U.S. Application Data

(63) Continuation of application No. 15/219,088, filed on Jul. 25, 2016, now Pat. No. 9,922,653, which is a
(Continued)

(51) Int. Cl.
*G10L 15/30* (2013.01)
*G06Q 30/02* (2012.01)
(Continued)

(52) U.S. Cl.
CPC .......... *G10L 15/30* (2013.01); *G06F 17/2725* (2013.01); *G06F 17/28* (2013.01);
(Continued)

(58) Field of Classification Search
CPC ...................................... G10L 15/30
(Continued)

(56) References Cited

U.S. PATENT DOCUMENTS 7,197,459 B1   3/2007  Harinarayan
7,912,726 B2   3/2011  Alshawi
(Continued)

FOREIGN PATENT DOCUMENTS

WO   2017044368   3/2017
WO   2017044369   3/2017
(Continued)

OTHER PUBLICATIONS

Amazon, "Amazon Mechanical Turk API Reference", API Version Mar. 25, 2012, available at: http://awsdocs.s3.amazonaws.com/MechTurk/20120325/amt-API-20120325.pdf, 234 pages.
(Continued)

*Primary Examiner* — Susan I McFadden
(74) *Attorney, Agent, or Firm* — Ohlandt, Greeley, Ruggiero & Perle, L.L.P.

(57) ABSTRACT

Systems and methods of validating transcriptions of natural language content using crowdsourced validation jobs are provided herein. In various implementations, a transcription pair comprising natural language content and text corresponding to a transcription of the natural language content may be gathered. A group of validation devices may be selected for reviewing the transcription pair. A crowdsourced validation job may be created for the group of validation devices. The crowdsourced validation job may be provided to the group of validation devices. One or more votes representing whether or not the text accurately represents the natural language content may be received from the group of validation devices. Based on the one or more votes received, the transcription pair may be stored in a validated transcription library, which may be used to process end-user voice data.

28 Claims, 11 Drawing Sheets

Related U.S. Application Data continuation of application No. 14/846,935, filed on Sep. 7, 2015, now Pat. No. 9,401,142.

(51) Int. Cl.
| | |
|---|---|
| *G06Q 50/00* | (2012.01) |
| *G06F 17/27* | (2006.01) |
| *G06F 17/28* | (2006.01) |
| *G10L 15/01* | (2013.01) |

(52) U.S. Cl.
CPC ............ *G06Q 30/02* (2013.01); *G06Q 50/01* (2013.01); *G10L 15/01* (2013.01)

(58) Field of Classification Search
USPC ....................................................... 704/235
See application file for complete search history.

(56) References Cited

U.S. PATENT DOCUMENTS

| | | |
|---|---|---|
| 7,966,180 B2 | 6/2011 | Bajaj |
| 8,731,925 B2 | 5/2014 | Da Palma |
| 8,805,110 B2 | 8/2014 | Rhoads |
| 8,847,514 B1 | 9/2014 | Reynoso |
| 8,849,259 B2 | 9/2014 | Rhoads |
| 8,855,712 B2 | 10/2014 | Lord |
| 8,886,206 B2 | 11/2014 | Lord |
| 8,925,057 B1 | 12/2014 | Ansari |
| 8,929,877 B2 | 1/2015 | Rhoads |
| 9,008,724 B2 | 4/2015 | Lord |
| 9,043,196 B1 | 5/2015 | Leydon |
| 9,047,614 B2 | 6/2015 | Kalikivayi |
| 9,190,055 B1 | 11/2015 | Kiss |
| 9,361,887 B1 | 6/2016 | Braga |
| 9,401,142 B1 | 7/2016 | Rothwell |
| 9,436,738 B2 | 9/2016 | Ehsani |
| 9,448,993 B1 | 9/2016 | Braga |
| 9,452,355 B1 | 9/2016 | Lin |
| 9,519,766 B1 | 12/2016 | Bhosale |
| 9,734,138 B2 | 8/2017 | Rothwell |
| 2002/0065848 A1 | 5/2002 | Walker |
| 2003/0126114 A1 | 7/2003 | Tedesco |
| 2004/0093220 A1 | 5/2004 | Kirby |
| 2004/0138869 A1 | 7/2004 | Heinecke |
| 2005/0108001 A1 | 5/2005 | Aarskog |
| 2007/0044017 A1 | 2/2007 | Zhu |
| 2007/0050191 A1 | 3/2007 | Weider |
| 2007/0100861 A1 | 5/2007 | Novy |
| 2007/0192849 A1 | 8/2007 | Golle |
| 2007/0198952 A1 | 8/2007 | Pittenger |
| 2007/0265971 A1 | 11/2007 | Smalley |
| 2008/0046250 A1 | 2/2008 | Agapi |
| 2009/0013244 A1 | 1/2009 | Cudich |
| 2009/0122970 A1 | 5/2009 | Kearney |
| 2009/0150983 A1 | 6/2009 | Saxena |
| 2011/0054900 A1 | 3/2011 | Phillips |
| 2011/0225629 A1 | 9/2011 | Pai |
| 2011/0252339 A1 | 10/2011 | Lemonik |
| 2012/0066773 A1 | 3/2012 | Weisberger |
| 2012/0197770 A1 | 8/2012 | Raheja |
| 2012/0232907 A1 | 9/2012 | Ivey |
| 2012/0254971 A1 | 10/2012 | Hu |
| 2012/0265528 A1 | 10/2012 | Gruber |
| 2012/0265578 A1 | 10/2012 | Olding |
| 2012/0284090 A1 | 11/2012 | Marins |
| 2013/0054228 A1 | 2/2013 | Baldwin |
| 2013/0132091 A1 | 5/2013 | Skerpac |
| 2013/0231917 A1 | 9/2013 | Naik |
| 2013/0253910 A1 | 9/2013 | Turner |
| 2013/0262114 A1 | 10/2013 | Brockett |
| 2013/0289994 A1 | 10/2013 | Newman |
| 2013/0304454 A1 | 11/2013 | Kimberly |
| 2013/0325484 A1 | 12/2013 | Chakladar |
| 2014/0067451 A1 | 3/2014 | Balamurugan |
| 2014/0156259 A1 | 6/2014 | Dolan |
| 2014/0167931 A1 | 6/2014 | Lee |
| 2014/0193087 A1 | 7/2014 | Conwell |
| 2014/0196133 A1 | 7/2014 | Shuster |
| 2014/0244254 A1 | 8/2014 | Ju |
| 2014/0249821 A1 | 9/2014 | Kennewick |
| 2014/0279780 A1 | 9/2014 | Dasgupta |
| 2014/0304833 A1 | 10/2014 | Gujar |
| 2014/0358605 A1 | 12/2014 | Balamurugan |
| 2015/0006178 A1 | 1/2015 | Peng |
| 2015/0095031 A1 | 4/2015 | Conkie |
| 2015/0120723 A1 | 4/2015 | Deshmukh |
| 2015/0128240 A1 | 5/2015 | Richards |
| 2015/0154284 A1 | 6/2015 | Pfeifer |
| 2015/0169538 A1 | 6/2015 | Reynolds |
| 2015/0213393 A1 | 7/2015 | O'Neill |
| 2015/0269499 A1 | 9/2015 | B |
| 2015/0278749 A1 | 10/2015 | Bhagat |
| 2015/0339940 A1 | 11/2015 | Aggarwal |
| 2015/0341401 A1 | 11/2015 | Lee |
| 2016/0012020 A1 | 1/2016 | George |
| 2016/0048486 A1 | 2/2016 | Lopategui |
| 2016/0048934 A1 | 2/2016 | Gross |
| 2016/0285702 A1 | 9/2016 | Beausoleil |
| 2016/0329046 A1 | 11/2016 | Gross |
| 2016/0342898 A1 | 11/2016 | Ehsani |
| 2017/0017779 A1 | 1/2017 | Huang |
| 2017/0039505 A1 | 2/2017 | Prabhakara et al. |
| 2017/0068651 A1 | 3/2017 | Rothwell |
| 2017/0068656 A1 | 3/2017 | Braga |
| 2017/0068659 A1 | 3/2017 | Rothwell |
| 2017/0068809 A1 | 3/2017 | Bhosale |
| 2017/0069039 A1 | 3/2017 | Kennewick |
| 2017/0069325 A1 | 3/2017 | Braga |
| 2017/0069326 A1 | 3/2017 | Rothwell |

FOREIGN PATENT DOCUMENTS

| | | |
|---|---|---|
| WO | 2017044370 | 3/2017 |
| WO | 2017044371 | 3/2017 |
| WO | 2017044408 | 3/2017 |
| WO | 2017044409 | 3/2017 |
| WO | 2017044415 | 3/2017 |

OTHER PUBLICATIONS

Amazon, "Amazon Mechanical Turk Developer Guide", API Version Mar. 25, 2012, available at: http://awsdocs.s3.amazonaws.com/MechTurk/20120325/amt-dgi-20120325.pdf, 43 pages.

Amazon, "Amazon Mechanical Turk Getting Started Guide", API Version Mar. 25, 2012, available at http://awsdocs.s3.amazonaws.com/MechTurk/20120325/amt-gsg-20120325.pdf, 36 pages.

Amazon, "Amazon Mechanical Turk Requester UI Guide", API Version Mar. 25, 2012, available at http://awsdocs.s3.amazonaws.com/MechTurk/20120325/amt-ui-20120325.pdf, 59 pages.

Badenhorst, Jaco, et al., "Quality Measurements for Mobile Data Collection in the Developing World", SLTU, 2012, 7 pages.

Bontcheva, Kalina, et al. "Crowdsourcing Named Entity Recognition and Entity Linking Corpora", Handbook of Linguistic Annotation, Springer, 2014, 18 pages.

Braunschweig, Katrin, et al., "Enhancing Named Entity Extraction by Effectively Incorporating the Crowd", BTW Vorkshops, 2013, pp. 181-195.

Buchholz, Sabine, et al., "Crowdsourcing Preference Tests, and How to Detect Cheating", in Interspeech 2011, 4 pages.

Callison-Burch, Chris, et al., "Creating speech and language data with Amazon's Mechanical Turk", Proceedings of the NAACL HLT 2010 Workshop on Creating Speech and Language Data with Amazon's Mechanical Turk, Association for Computational Linguistics, 2010, 12 pages.

Carmel, David, et al., "ERD'14: Entity Recognition and Disambiguation Challenge", ACM SIGIR Forum, vol. 48, No. 2, 2014, pp. 63-77.

De Vries, Nic J., et al., "A Smartphone-Based ASR Data Collection Tool for Under-Resourced Languages", Speech communication, vol. 56, 2014, pp. 119-131.

(56) References Cited

OTHER PUBLICATIONS

Derczynski, Leon, et al., "Analysis of Named Entity Recognition and Linking for Tweets", Information Processing & Management, vol. 51, No. 2, 2015, pp. 32-49.

Draxler, Christoph, "Interfaces for Crowdsourcing Platforms", from "Crowdsourcing for Speech Processing: Applications to Data Collection, Transcription, and Assessment", Chapter 9, pp. 241-278, John Wiley & Sons, 2013, 48 pages.

Eickhoff, C. et al., "Increasing Cheat Robustness of Crowdsourcing Tasks", Information Retrieval, vol. 16, No. 2, 2013, 18 pages.

Eickhoff, Carsten, "How Crowdsourcable is Your Task?", Proceedings of the Workshop on Crowdsourcing for Search and Data Mining, Feb. 9, 2011, pp. 11-14.

Finin, Tim, et al., "Annotating Named Entities in Twitter Data With Crowdsourcing", Proceedings of the NAACL HLT 2010 Workshop on Creating Speech and Language Data With Amazon's Mechanical Turk, Association for Computational Linguistics, Jun. 2010, pp. 80-88.

Freitas, Joao, et al., "Crowd-sourcing Platform for Large-Scale Speech Data Collection", Proc. FALA, 2010, 4 pages.

Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.

Gennaro, Rosario, et al., "Non-Interactive Verifiable Computing: Outsourcing Computation to Untrusted Workers", Advances in Cryptology—Crypto 2010, Springer Berlin Heidelberg, 2010, 19 pages.

Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.

Hughes, Thad, et al., "Building Transcribed Speech Corpora Quickly and Cheaply for Many Languages", Interspeech, 2010, 4 pages.

Ipeirotis, Panagiotis G., "Quality Management on Amazon Mechanical Turk", Proceedings of the ACM SIGKDD Workshop on Human Computation, ACM, Jul. 2010, pp. 64-67.

Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.

Lawson, Nolan, et al., "Annotation Large Email Datasets for Named Entity Recognition with Mechanical Turk", Proceedings of the NAACL HLT 2010 Workshop on Creating Speech and Language Data With Amazon's Mechanical Turk, Association for Computational Linguistics, Jun. 2010, pp. 71-79.

Levenshtein, V., I., Binary Codes Capable of Correcting Deletions, Insertions, and Reversals, Soviet Physics-Doklady, vol. 10, No. 8, Feb. 1966, pp. 707-710.

Liu, Sean, et al., "A Collective Data Generation Method for Speech Language Models", Spoken Language Technology Workshop (SLT), 2010 IEEE, IEEE, 2010, 6 pages.

McGraw, "Collecting Speech from Crowds", from "Crowdsourcing for Speech Processing: Applications to Data Collection, Transcription, and Assessment", Chapter 3, pp. 37-71, John Wiley & Sons, 2013, 44 pages.

McGraw, Ian Carmichael, "Crowd-Supervised Training of Spoken Language Systems", Dissertation, Massachusetts Institute of Technology, 2012, 166 pages.

McGraw, Ian, et al., "Collecting Voices from the Cloud", LREC, 2010, 8 pages.

McGraw, Ian, et al., "How to Control and Utilize Crowd-Collected Speech", from "Crowdsourcing for Speech Processing: Applications to Data Collection, Transcription, and Assessment", Chapter 5, pp. 106-136, John Wiley & Sons, 2013, 40 pages.

Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.

Rutherford, Attapol T., et al., "Pronunciation Learning for Named-Entities Through Crowd-Sourcing", Proceedings of the 15th Annual Conference on the International Speech Communication Association, 2015, 5 pages.

Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.

Sabou, Marta, et al., "Corpus Annotation through Crowdsourcing: Towards Best Practice Guidelines", Proceedings of the 9th International Conference on Language Resources and Evaluation, Reykjavik, Iceland, 2014, 8 pages.

Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.

Suzic, Sinisa, et al., "On the Realization of AnSpeechCollector, System for Creating Transcribed Speech Database", 2014, 4 pages.

Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.

Wang, Gang, et al., Serf and Turf: Crowdturfing for Fun and Profit, Proceedings of the WWW, New York, Apr. 16, 2012, pp. 679-688.

US 10,504,522 B2

SYSTEM AND METHOD FOR VALIDATING NATURAL LANGUAGE CONTENT USING CROWDSOURCED VALIDATION JOBS

RELATED APPLICATIONS

This application is a continuation of U.S. patent application Ser. No. 15/219,088, entitled "SYSTEM AND METHOD FOR VALIDATING NATURAL LANGUAGE CONTENT USING CROWDSOURCED VALIDATION JOBS", filed Jul. 25, 2016 (issued as U.S. Pat. No. 9,922,653, on Mar. 20, 2018), which is a continuation of U.S. patent application Ser. No. 14/846,935, entitled "SYSTEM AND METHOD FOR VALIDATING NATURAL LANGUAGE CONTENT USING CROWDSOURCED VALIDATION JOBS," filed Sep. 7, 2015 (issued as U.S. Pat. No. 9,401,142, on Jul. 26, 2016), the content of which are hereby incorporated by reference in their entireties.

FIELD OF THE INVENTION

The field of the invention generally relates to validating transcriptions of natural language content, and in particular, to distributing transcriptions of natural language content to validator devices, and to using the validator devices to validate the transcriptions of the natural language content.

BACKGROUND OF THE INVENTION

By translating voice data into text, speech recognition has played an important part in many Natural Language Processing (NLP) technologies. For instance, speech recognition has proven useful to technologies involving vehicles (e.g., in-car speech recognition systems), technologies involving health care, technologies involving the military and/or law enforcement, technologies involving telephony, and technologies that assist people with disabilities. Speech recognition systems are often trained and deployed to end-users. The training phase typically involves training an acoustic model in the speech recognition system to recognize text in voice data. The training phase often includes capturing voice data, transcribing the voice data into text, and storing pairs of voice data and text in transcription libraries. The end-user deployment phase typically includes using a trained acoustic model to identify text in voice data provided by end-users.

Conventionally, transcribing voice data into text in the training phase proved difficult. Transcribing voice data into text often requires analysis of a large amount of voice data and/or variations in voice data. In some transcription processes, dedicated transcription teams listened to voice data and manually entered text corresponding to the voice data into transcription libraries. These transcription processes often proved expensive and/or impractical due to the large number of sound variations in different words, intonations, pitches, tones, etc. in a given language.

Some transcription processes have distributed transcription tasks to different people, such as individuals with voice-enabled devices. Though some of these crowdsourced transcription processes are less expensive and/or more practical than transcription processes involving dedicated teams, these crowdsourced transcription processes often introduce noise into the transcription process. Examples of noise commonly occurring in crowdsourced transcription processes include errors from incorrect transcriptions and intentionally introduced inaccuracies (e.g., spam, promotional content, inappropriate content, illegal content, etc.).

While conventional noise filtering techniques may reduce noise in many types of crowdsourcing processes, conventional noise filtering techniques have not effectively reduced noise well for many crowdsourced transcription processes. For example, errors from incorrect transcriptions may exhibit irregular patterns, and may difficult to identify without a dedicated audit or validation process. As another example, though errors related to intentionally introduced inaccuracies may exhibit regular patterns, spammers and others introducing these errors may be able to circumvent automated validation measures (test questions, captions that are not machine-readable, audio that is not understandable to machines, etc.). It would be desirable to provide systems and methods that effectively transcribe speech to text without significant noise.

SUMMARY OF THE INVENTION

This systems and methods herein present strategies for measuring and assuring high quality when performing large-scale crowdsourcing data collections for acoustic model training. The systems and methods herein limit different types of inaccuracies (e.g., intentionally introduced inaccuracies as well as errors from validators) encountered while collecting and validating speech audio from unmanaged crowds. In some implementations, a mobile application funnels workers from a crowdsourced natural language training platform and allows the gathering of voice data under controlled conditions. A multi-step crowdsourced validation process ensures that validators are paid only when they have actually used our application to complete their tasks. The collected audio is run through a crowdsourcing validation jobs designed to validate that the speech matches the text with which the speakers were prompted. For each validation task, test questions, non-machine-readable images, and/or non-machine-readable sounds in conjunction with the surveys, questionnaires, etc. may be used in combination with expected answer distribution rules and monitoring of validator activity levels over time to detect and expel likely spammers. Inter-annotator agreement may be used to ensure high confidence of validated judgments. The systems and methods described herein provide high levels of accuracy with minor errors, and other advantages set forth herein.

Systems and methods of validating transcriptions of natural language content using crowdsourced validation jobs are provided herein. In various implementations, a transcription pair comprising natural language content and text corresponding to a transcription of the natural language content may be gathered. A first group of validation devices may be selected for reviewing the transcription pair. A first crowdsourced validation job may be created for the first group of validation devices. The first crowdsourced validation job may be provided to the first group of validation devices. A vote representing whether or not the text accurately represents the natural language content may be received from each of the first group of validation devices. A validation score may be assigned to the transcription pair based, at least in part, on the votes from each of the first group of validation devices.

In some implementations, the method comprises: determining whether or not the first group of validation devices agreed the text accurately represents the natural language content; and determining whether to provide the transcription pair to a second group of validation devices. If the first group of validation devices did not agree the text accurately represents the natural language content, the method may further comprise: providing the transcription pair to the second group of validation devices; receiving from each of the second group of validation devices a vote representing whether or not the text accurately represents the natural language content; and updating the validation score using on the votes from each of the second group of validation devices.

In some implementations, the method may further comprise: identifying a confidence score of each of the first group of validation devices, the confidence score representing confidence in the vote from the each of the first group of validation devices; and updating the validation score using the confidence score. The first group of validation devices may be two validation devices.

In various implementations, the first instructions may configure the first group of validation devices to display the voice data and the text in a survey on a mobile application on the first group of validation devices. The survey may include one or more tasks configured to assist engagement of first validators associated with the first group of validation devices when voting. The survey may include one or more of: test questions, captions that are not machine-readable, and audio that is not understandable to machines.

In some implementations, the method may further comprise: identifying a plurality of transcription devices performing crowdsourced transcription jobs; and selecting the first group of validation devices from the plurality of transcription devices. In some implementations, the method may further comprise: storing the transcription pair in a validated transcription library if the validation score of the transcription pair exceeds a validation threshold. In some implementations, the method may further comprise: using the transcription pair from the validated transcription to transcribe end-user voice data in real-time.

These and other objects, features, and characteristics of the system and/or method disclosed herein, as well as the methods of operation and functions of the related objects of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

According to various implementations discussed herein, transcriptions of voice data may be validated by crowdsourced validation jobs performed by groups of validation devices. The validation devices may be provided with voice data that has been transcribed by one or more transcription processes, and text corresponding to the transcription. Validators operating the validation devices may be asked whether the text is an accurate representation of the voice data. The validators may also be provided with surveys or other items to foster engagement, help reduce inaccuracies in validation processes, and/or monitor validator activity levels. Based on validators' responses, confidence scores may be assigned to the crowdsourced validation jobs. According to some implementations, the confidence scores may be used for additional validation processes. For instance, if the confidence scores suggest the text may not accurately represent the voice data, the voice data and the text may be provided to additional groups of transcription devices for further validation. The validation devices may execute a mobile application that provides validators with payments for successful crowdsourced validation jobs.

Example of a System Architecture

The Structures of the Natural Language Processing Environment 100

Figure 1:
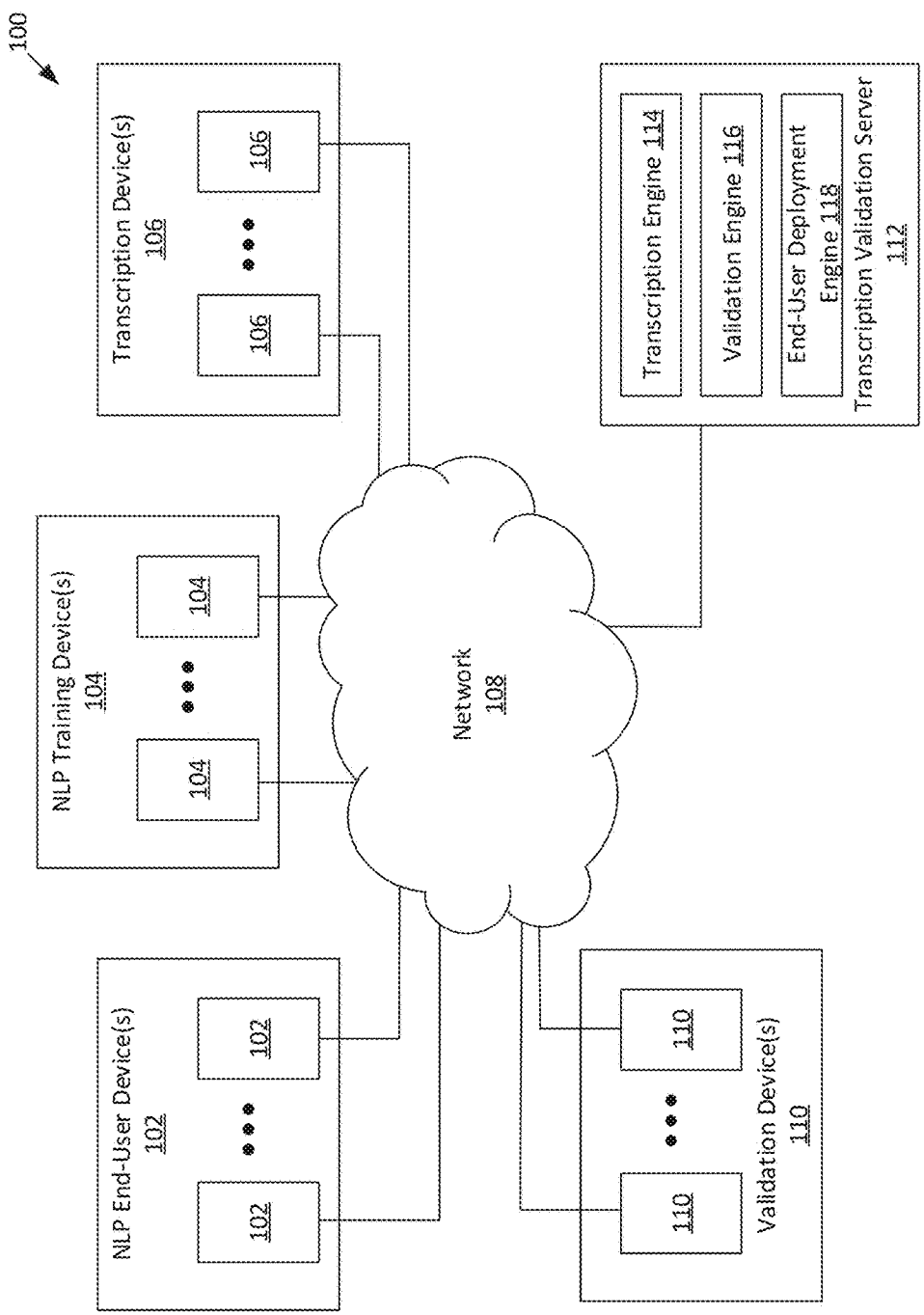
FIG. 1 illustrates a block diagram of an example of a natural language processing environment, according to some implementations.

FIG. 1 illustrates a block diagram of a natural language processing environment 100, according to some implementations. The natural language processing environment 100 may include Natural Language Processing (NLP) end-user device(s) 102, NLP training device(s) 104, transcription device(s) 106, a network 108, validation device(s) 110, and a transcription validation server 112. The NLP end-user device(s) 102, the NLP training device(s) 104, the transcription device(s) 106, the validation device(s) 110, and the transcription validation server 112 are shown coupled to the network 108.

The NLP end-user device(s) 102 may include one or more digital devices configured to provide an end-user with natural language transcription services. A "natural language transcription service," as used herein, may include a service that converts audio contents into a textual format. A natural language transcription service may recognize words in audio contents, and may provide an end-user with a textual representation of those words. The natural language transcription service may be incorporated into an application, process, or run-time element that is executed on the NLP end-user device(s) 102. In an implementation, the natural language transcription service is incorporated into a mobile application that executes on the NLP end-user device(s) 102 or a process maintained by the operating system of the NLP end-user device(s) 102. In various implementations, the natural language transcription service may be incorporated into applications, processes, run-time elements, etc. related to technologies involving vehicles, technologies involving health care, technologies involving the military and/or law enforcement, technologies involving telephony, technologies that assist people with disabilities, etc. The natural language transcription service may be supported by the transcription device(s) 106, the validation device(s) 110, and the transcription validation server 112, as discussed further herein.

The NLP end-user device(s) 102 may include components, such as memory and one or more processors, of a computer system. The memory may further include a physical memory device that stores instructions, such as the instructions referenced herein. The NLP end-user device(s) 102 may include one or more audio input components (e.g., one or more microphones), one or more display components (e.g., one or more screens), one or more audio output components (e.g., one or more speakers), etc. In some implementations, the audio input components of the NLP end-user device(s) 102 may receive audio content from an end-user, the display components of the NLP end-user device(s) 102 may display text corresponding to transcriptions of the audio contents, and the audio output components of the NLP end-user device(s) 102 may play audio contents to the end-user. It is noted that in various implementations, however, the NLP end-user device(s) 102 need not display transcribed audio contents, and may use transcribed audio contents in other ways, such as to provide commands that are not displayed on the NLP end-user device(s) 102, use application functionalities that are not displayed on the NLP end-user device(s) 102, etc. The NLP end-user device(s) 102 may include one or more of a networked phone, a tablet computing device, a laptop computer, a desktop computer, a server, or some combination thereof.

The NLP training device(s) 104 may include one or more digital device(s) configured to receive voice data from an NLP trainer. An "NLP trainer," as used herein, may refer to a person who provides voice data during a training phase of the natural language processing environment 100. The voice data provided by the NLP trainer may be used as the basis of transcription libraries that are used during an end-user deployment phase of the natural language processing environment 100. The NLP training device(s) 104 may include components, such as memory and one or more processors, of a computer system. The memory may further include a physical memory device that stores instructions, such as the instructions referenced herein. The NLP training device(s) 104 may include one or more audio input components (e.g., one or more microphones), one or more display components (e.g., one or more screens), one or more audio output components (e.g., one or more speakers), etc. The NLP training device(s) 104 may support a mobile application, process, etc. that is used to capture voice data during the training phase of the natural language processing environment 100. The NLP end-user device(s) 102 may include one or more of a networked phone, a tablet computing device, a laptop computer, a desktop computer, a server, or some combination thereof.

The transcription device(s) 106 may include one or more digital devices configured to support natural language transcription services. The transcription device(s) 106 may receive transcription job data from the transcription validation server 112. A "transcription job," as described herein, may refer to a request to transcribe audio content into text. "Transcription job data" may refer to data related to a completed transcription job. Transcription job data may include audio content that is to be transcribed, as well as other information (transcription timelines, formats of text output files, etc.) related to transcription. The transcription device(s) 106 may further provide transcription job data, such as text related to a transcription of audio contents, to the transcription validation server 112. In some implementations, the transcription device(s) 106 gather voice data from the NLP training device(s) 104 during a training phase of the natural language processing environment 100.

In some implementations, the transcription device(s) 106 implement crowdsourced transcription processes. In these implementations, an application or process executing on the transcription device(s) 106 may receive transcription job data from the transcription validation server 112 (e.g., from the transcription engine 114). The transcription job data may specify particular items of audio content an end-user is to transcribe. The transcribers need not, but may, be trained transcribers.

In various implementations, the transcription device(s) 106 comprise digital devices that perform transcription jobs using dedicated transcribers. In these implementations, the transcription device(s) 106 may comprise networked phone(s), tablet computing device(s), laptop computer(s), desktop computer(s), etc. that are operated by trained transcribers. As an example of these implementations, the transcription device(s) 106 may include computer terminals in a transcription facility that are operated by trained transcription teams.

The network 108 may comprise any computer network. The network 108 may include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. In various implementations, the network 108 may be implemented as a computer-readable medium, such as a bus, that couples components of a single computer together. For illustrative purposes, it is assumed the network 108 broadly includes, as understood from relevant context, anything from a minimalist coupling of the components illustrated in the example of FIG. 1, to every component of the Internet and networks coupled to the Internet.

In various implementations, the network 108 may include technologies such as Ethernet, 802.11, worldwide interoperability for microwave access (WiMAX), 3G, 4G, CDMA, GSM, LTE, digital subscriber line (DSL), etc. The network 108 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 108 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In some implementations, the network 108 comprises secure portions. The secure portions of the network 108 may correspond to a networked resources managed by an enterprise, networked resources that reside behind a specific gateway/router/switch, networked resources associated with a specific Internet domain name, and/or networked resources managed by a common Information Technology ("IT") unit.

The validation device(s) 110 may include one or more digital devices configured to validate natural language transcriptions. The validation device(s) 110 may receive validation job data from the transcription validation server 112 (e.g., from the validation engine 116). A "validation job," as used herein, may refer to a request to verify the outcome of a transcription job. "Validation job data" or a "validation unit," as described herein, may refer to data related to a crowdsourced validation job. In some implementations, validation job data may comprise information related to a transcription job (e.g., voice data that has been transcribed as part of the transcription job, and text corresponding to the transcription). The crowdsourced validation job data may also include validator engagement information, such as surveys, ratings of validation processes, games, etc. Validator engagement information may help foster engagement, help reduce inaccuracies in validation processes, and/or monitor validator activity levels, as described further herein. For example, in an implementation, the validator engagement information include information that supports an engagement survey that, in turn, asks a validator whether voice data and corresponding text are exactly identical. The engagement survey may further ask a validator the extent text corresponding to voice data deviates from the voice data.

In various implementations, the validation device(s) 110 implement crowdsourced validation processes. A "crowdsourced validation process," as described herein, may include a process that distributes a plurality of validation jobs to a plurality of validators. The validators may comprise trained validators or untrained validators. An "trained validator," as described herein, may refer to a person that has formal and/or specialized education, experience, skills, etc. in validating transcriptions; while an "untrained validator," as described herein, may refer to a person that lacks formal and/or specialized education, experience, skills, etc. in validating transcriptions. Untrained validators may also lack formal agreements with entities managing the transcription validation server 112. In an implementation, the qualifications of untrained validators may not be analyzed by entities managing the transcription validation server 112. The crowdsourced validation process may receive support from an application, process, etc. executing on the validation device(s) 110. For example, in some implementations, the crowdsourced validation processes are supported by a mobile application executing on the validation device(s) 110. Moreover, in various implementations, the validators using the validation device(s) 110 may comprise a subset of transcribers who were funneled off of the transcription device(s) 106 using incentives (payments, video game points, etc.).

The validation device(s) 110 may provide validation job outcomes to transcription validation server 112 (e.g., from the validation engine 116). "Validation job outcomes," as described herein, may refer to responses to validation jobs. Validation job outcomes may include identifiers of validation job data, values that represent whether or not text and voice data in validation job data match one another, and responses related to validator engagement information (results of engagement surveys, etc.). In some implementations, the validation device(s) 110 receives validation job scoring data, which, as used herein, may refer to data related to scoring validation job outcomes. Examples of validation job scoring data may include points, amounts of digital currency, amounts of actual currencies, etc. provided to validators for performing validation jobs.

The transcription validation server 112 may comprise one or more digital devices configured to support natural language transcription services. The transcription validation server 112 may include a transcription engine 114, a validation engine 116, and an end-user deployment engine 118.

The transcription engine 114 may transcribe voice data into text during a training phase of the natural language processing environment 100. More specifically, the transcription engine 114 may collect audio content from the NLP training device(s) 104, and may create and/or manage transcription jobs. The transcription engine 114 may further receive transcription job data related to transcription jobs from the transcription device(s) 106.

Figure 2:
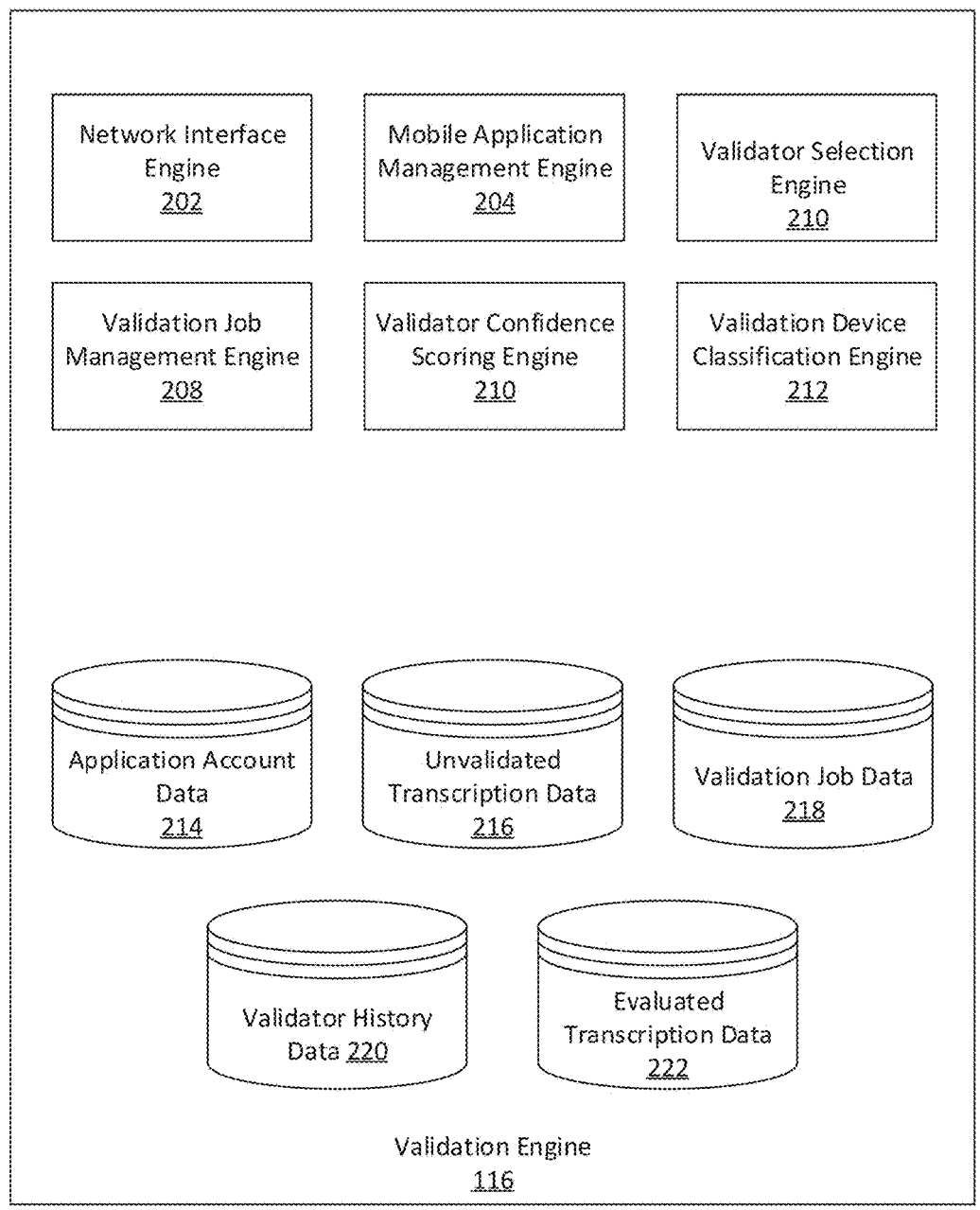
FIG. 2 illustrates a block diagram of an example of a validation engine, according to some implementations.

The validation engine 116 may manage validation of transcriptions of voice data during a training phase of the natural language processing environment 100. In various implementations, the validation engine 116 provides validation jobs and/or validation job scoring data to the validation device(s) 110. The validation engine 116 may further receive validation job outcomes from the validation device(s) 110. The validation engine 116 may store validated transcription data in a validated transcription data datastore. The validated transcription data datastore may be used during an end-user deployment phase of the natural language processing environment 100. FIG. 2 illustrates a block diagram of the validation engine 116 in greater detail.

The end-user deployment engine 118 may provide natural language transcription services to the NLP end-user device(s) 102 during an end-user deployment phase of the natural language processing environment 100. In various implementations, the end-user deployment engine 118 uses a validated transcription data datastore. Transcriptions in the validated transcription data datastore may have been initially transcribed by the transcription device(s) 106 and the transcription engine 114, and validated by the validation device(s) 110 and the validation engine 116.

Though FIG. 1 shows the NLP end-user device(s) 102, the NLP training device(s) 104, the transcription device(s) 106, and the validation device(s) 110 as distinct sets of devices, it is noted that in various implementations, one or more of the NLP end-user device(s) 102, the NLP training device(s) 104, the transcription device(s) 106, and the validation device(s) 110 may reside on a common set of devices. For example, in some implementations, devices used as the basis of the transcription device(s) 106 may correspond to devices used as the basis of the NLP training device(s) 104. In these implementations, people may use a digital device configured: as an NLP training device(s) 104 to provide voice data, and as a transcription device(s) 106 to transcribe voice data provided by other people. Moreover, in various implementations, the validation device(s) 110 may be taken from a subset of the transcription device(s) 106. In these implementations, validators may be funneled off of transcription jobs by inducements, in-application elements, etc. as discussed further herein.

The Structures of the Validation Engine 116

FIG. 2 illustrates a block diagram of a validation engine 116, according to some implementations. The validation engine 116 may include a network interface engine 202, a mobile application management engine 204, a validator selection engine 206, a validation job management engine 208, a validator confidence scoring engine 210, a validation job data classification engine 212, an application account data datastore 214, an unvalidated transcription data datastore 216, a crowdsourced validation job data datastore 218, a validator history data datastore 220, and an evaluated transcription data datastore 222. One or more of the network interface engine 202, the mobile application management engine 204, the validator selection engine 206, the validation job management engine 208, the validator confidence scoring engine 210, the validation job data classification engine 212, the application account data datastore 214, the unvalidated transcription data datastore 216, the crowdsourced validation job data datastore 218, the validator history data datastore 220, and the evaluated transcription data datastore 222 may be coupled to one another or to modules not shown in FIG. 2.

The network interface engine 202 may be configured to send data to and receive data from the network 108. In some implementations, the network interface engine 202 is implemented as part of a network card (wired or wireless) that supports a network connection to the network 108. The network interface engine 202 may control the network card and/or take other actions to send data to and receive data from the network 108.

The mobile application management engine 204 may be configured to manage a mobile application on the validator device(s) 108. More particularly, the mobile application management engine 204 may instruct a mobile application on the validator device(s) 108 to render on the screens of the validator device(s) 108 pairs of voice data and text corresponding to the voice data. The mobile application management engine 204 may further instruct the validator device(s) 108 to display surveys, questionnaires, etc. that ask validators whether the text in a pair is an accurate representation of voice data in the pair. The mobile application management engine 204 may further instruct the validator device(s) 108 to display surveys, questionnaires, etc. that ask validators about the extent text and voice data in a pair deviate from one another. The mobile application management engine 204 may instruct the validator device(s) 108 to display test questions, non-machine-readable images, and/or non-machine-readable sounds in conjunction with the surveys, questionnaires, etc.

In some implementations, the mobile application managed by the mobile application management engine 204 is distinct from the mobile application used to collect voice data from the NLP end-user device(s) 102 and/or perform crowdsourced transcription jobs on voice data collected from the NLP training device(s) 104. However, it is noted that in various implementations, the mobile application managed by the mobile application management engine 204 may be a single mobile application that supports modules for collecting voice data, supports modules for crowdsourced transcriptions of voice data, and supports modules for validating crowdsourced transcriptions of voice data.

The validator selection engine 206 may be configured to select people to identify as validators. In an implementation, the validator selection engine 206 selects from the application account data datastore 214 user accounts of users to participate in crowdsourced validation jobs. As an example of a selection process in accordance with this implementation, the validator selection engine 206 may select specific transcribers associated with the transcription device(s) 106 to classify as validators (e.g., to participate in crowdsourced validation jobs). The selection process may include analysis of the user accounts and/or user actions associated with transcribers to identify whether the transcribers are trained or untrained.

In some implementations, the selection process implemented by the validator selection engine 206 involves funneling transcribers to perform validation jobs using user interface elements inserted into mobile applications executing on the transcription device(s) 106. For example, the validator selection engine 206 may instruct the mobile application management engine 204 to provide transcribers with a link to install validator modules and/or a validator application in which the validators perform crowdsourced validation jobs. As another example, in an implementation, the validator selection engine 206 instructs the mobile application management engine 204 to insert into a transcriber's mobile application pop-ups, notifications, messages, etc. that provide a hyperlink to a crowdsourced validation job and/or to provide account information to qualify as a validator. The validator selection engine 206 may classify as validators the transcribers indicating they wish to participate in crowdsourced validation jobs. The validator selection engine 206 may provide identifiers of validators to other modules, such as the mobile application management engine 204 and/or the validation job management engine 208.

The validation job management engine 208 may be configured to process (e.g., create, modify, etc.) validation jobs. More specifically, the validation job management engine 208 may select specific groups of validators to review unvalidated transcription data. In some implementations, the validation job management engine 208 gathers unvalidated transcription data from the unvalidated transcription data datastore 216 and gathers identifiers of validators from the validator selection engine 206. The validation job management engine 208 may create validation jobs that instruct selected validation device(s) 110 to determine whether text in an unvalidated transcription job is an accurate representation of voice data in the unvalidated transcription job.

In an implementation, the validation job management engine 208 provides validation jobs to groups of validation device(s) 110. The groups may comprise pairs (e.g., of validation device(s) 110. The groups may be chosen based on classifications of the validation device(s) 110 from the validation job data classification engine 212. Groups of validation device(s) 110 may also be based on validation job data and/or confidence scores. For example, in some implementations, the validation job management engine 208 reassigns to new validation device(s) 110 items of validation job data having "medium confidence—positive" confidence scores in order to ensure validation processes are accurate.

The validation job management engine 208 may further receive crowdsourced validation job data from the validation device(s) 110. In some implementations, the validation job management engine 208 calculates a validation score based on the crowdsourced validation job data. The validation score may depend on the confidence score, calculated by the validator confidence scoring engine 210, and discussed further herein. The validation score may also depend on the classification of the crowdsourced validation job data, determined by the validation job data classification engine 212, and discussed further herein.

The validator confidence scoring engine 210 may calculate a confidence score that represents a confidence in validation job data from particular validator device(s) 110. The confidence score may be based on a weighted average of submitted votes made by a particular validator device(s) 110. For example, in an implementation, the validator confidence scoring engine 210 may calculate the confidence score based on Equation (1) and Equation (2), shown herein. Equation (1) may calculate the weight ($W_i$) of an individual vote of one of the validator device(s) 110 for a particular validation job. In Equation (1), the variable n may represent the number of votes received for a crowdsourced validation job, and the variable k may represent the test question accuracy of the validator who supplied that vote. Equation (1) is as follows:

$$w_i = \frac{\sum_{j=1}^{n} k_j v_i}{n k_i} \quad \text{Equation (1)}$$

Equation (2) may calculate the average (K) of all validation job data outcomes, where each validated job data outcome is weighted by the result of Equation (1). Equation (2) is as follows:

$$K = \frac{\sum_{i=1}^{n} w_i v_{\frac{i}{w}}}{n} \quad \text{Equation (2)}$$

In some implementations, the validator confidence scoring engine 210 automatically removes validators from a crowdsourced validation job if confidence scores for those validators falls below a first confidence threshold. As an example, in some implementations, the validator confidence scoring engine 210 may remove all validators who have a confidence score of less than 70% using Equation (1) or Equation (2) herein. The validator confidence scoring engine 210 may provide the validation job management engine 208 with identifiers of validation jobs analyzed by removed validation device(s) 110.

The validation job data classification engine 212 may be configured to classify crowdsourced validation job data based on how accurate groups of the validation device(s) 110 performed particular crowdsourced validation jobs. In some implementations, the validation job data classification engine 212 may implement a voting classification algorithm that determines whether pairs of the validation device(s) 110 have reached similar conclusions about identical validation jobs. The voting classification algorithm may, but need not, be based on confidence scores of specific validators. As an example of a voting classification algorithm applied to groups of two validation device(s) 110:

The validation job data classification engine 212 may assign a first classification (e.g., "high confidence—positive") if a crowdsourced validation job has been reviewed by only two validation device(s) 110, and the two validation device(s) 110 have agreed the text in the crowdsourced validation job accurately represents voice data in the crowdsourced validation job.

The validation job data classification engine 212 may assign a second classification (e.g., "negative") if a crowdsourced validation job has been reviewed by only two validation device(s) 110, and the two validation device(s) 110 have agreed the text in the crowdsourced validation job does not accurately represent voice data in the crowdsourced validation job. In some implementations, the second category (e.g., "negative") may also be assigned if a crowdsourced validation job has been reviewed by two pairs of validation device(s) 110, each pair could not agree that the text in the crowdsourced validation job accurately represents voice data in the crowdsourced validation job, and if validation device(s) 110 who performed the crowdsourced validation job have a confidence score less than a second confidence threshold. The second confidence threshold may, but need not, be less than the first confidence threshold (e.g., in an implementation, the second confidence threshold may be 50%).

The validation job data classification engine 212 may assign a third classification (e.g., medium confidence—positive") if a crowdsourced validation job has been reviewed by two pairs of validation device(s) 110, the two validation device(s) in the first pair have disagreed about whether the text in the crowdsourced validation job accurately represents voice data in the crowdsourced validation job, and the two validation device(s) in the second pair have agreed that text in the crowdsourced validation job accurately represents voice data in the crowdsourced validation job.

The validation job data classification engine 212 may assign a fourth classification (e.g., "low-confidence—positive") if a crowdsourced validation job has been reviewed by two pairs of validation device(s) 110, the two validation device(s) in the first pair have disagreed about whether the text in the crowdsourced validation job accurately represents voice data in the crowdsourced validation job, and the two validation device(s) in the second pair have disagreed about whether the text in the crowdsourced validation job accurately represents voice data in the crowdsourced validation job. In an implementation, the fourth score is assigned only if validation device(s) 110 who performed the crowdsourced validation job have a confidence score less than a second confidence threshold. The second confidence threshold may, but need not, be less than the first confidence threshold (e.g., in an implementation, the second confidence threshold may be 50%).

The application account data datastore 214 may include account data related to validators. In some implementations, the application account data datastore 214 may store usernames, first and last names, addresses, phone numbers, emails, payment information, etc. associated with validators. The account data may correspond to account data of users of the mobile application managed by the mobile application management engine 204. For example, the account data may correspond to account data of all people who registered for the mobile application managed by the mobile application management engine 204. In various implementations, the account data corresponds to the account data of transcribers who have agreed to be validators. In these implementations, the account data may have been gathered from the transcription engine 114 or other modules not explicitly shown or discussed herein.

The unvalidated transcription data datastore 216 may store unvalidated transcription data. More specifically, the unvalidated transcription data datastore 216 may store voice data and text corresponding to transcriptions of the voice data. Each item of unvalidated transcription data may be stored as a separate data structure in the unvalidated transcription data datastore 216. In some implementations, the unvalidated transcription data may be associated with a completed transcription job. The unvalidated transcription data may have been gathered from the transcription engine 114, or other modules not explicitly described herein.

The crowdsourced validation job data datastore 218 may store validation job data. In some implementations, the crowdsourced validation job data may identify specific validation device(s) 110, as well as unvalidated transcription data (e.g., voice data and text pairs) for the specific validation device(s) 110. In various implementations, the crowdsourced validation job data identifies specific validation device(s) 110 and provides pointers, links, etc. to unvalidated transcription data in the unvalidated transcription data datastore 216 for the specific validation device(s) 110. The crowdsourced validation job data may be created and/or modified by the validation job management engine 208.

The validator history data datastore 220 may store data related to past votes made by specific validation device(s) 110. For each of the validator device(s) 110, the validator history data datastore 220 may store a number representing the accuracy of the validator device(s) 110. The data related to the past votes made by the specific validation device(s) 110 may represent the extent specific validation device(s) 110 have accurately validated crowdsourced validation jobs in the past.

The evaluated transcription data datastore 222 may store validation job data that has been evaluated by the validator device(s) 108. In some implementations, the evaluated transcription data datastore 222 stores transcription data that has been verified by crowdsourced validation processes managed by the validation job management engine 208. The evaluated transcription data datastore 222 may also store transcription data that that has failed the crowdsourced validation processes managed by the validation job management engine 208. The evaluated transcription data datastore 222 may mark whether or not specific items of transcription data have passed or failed crowdsourced verification processes using a flag or other mechanism.

The Natural Language Processing Environment 100 in Operation

The natural language processing environment 100 may operate to collect voice data, transcribe voice data into text, and validate transcriptions of voice data as discussed further below. As discussed herein, the natural language processing environment 100 may operate to support an end-user deployment phase in which voice data from NLP end users is collected and transcribed by validated transcription libraries. the natural language processing environment 100 may also operate to support a training phase in which transcription libraries are trained to recognize voice data and transcribe voice data accurately using crowdsourced transcription processes and crowdsourced validation processes.

Operation when Implementing an End-User Deployment Phase

The natural language processing environment 100 may operate to transcribe voice data from end-users during an end-user deployment phase. In the end-user deployment phase, NLP end-user device(s) 102 may provide voice data over the network 108 to the transcription validation server 112. The end-user deployment engine 118 may use trained transcription libraries that were created during the training phase of the natural language processing environment 100 to provide validated transcription data to the NLP end-user device(s) 102. In an implementation, the NLP end-user device(s) 102 streams the voice data to the transcription validation server 112, and the end-user deployment engine 118 returns real-time transcriptions of the voice data to the NLP end-user device(s) 102.

Figure 3:
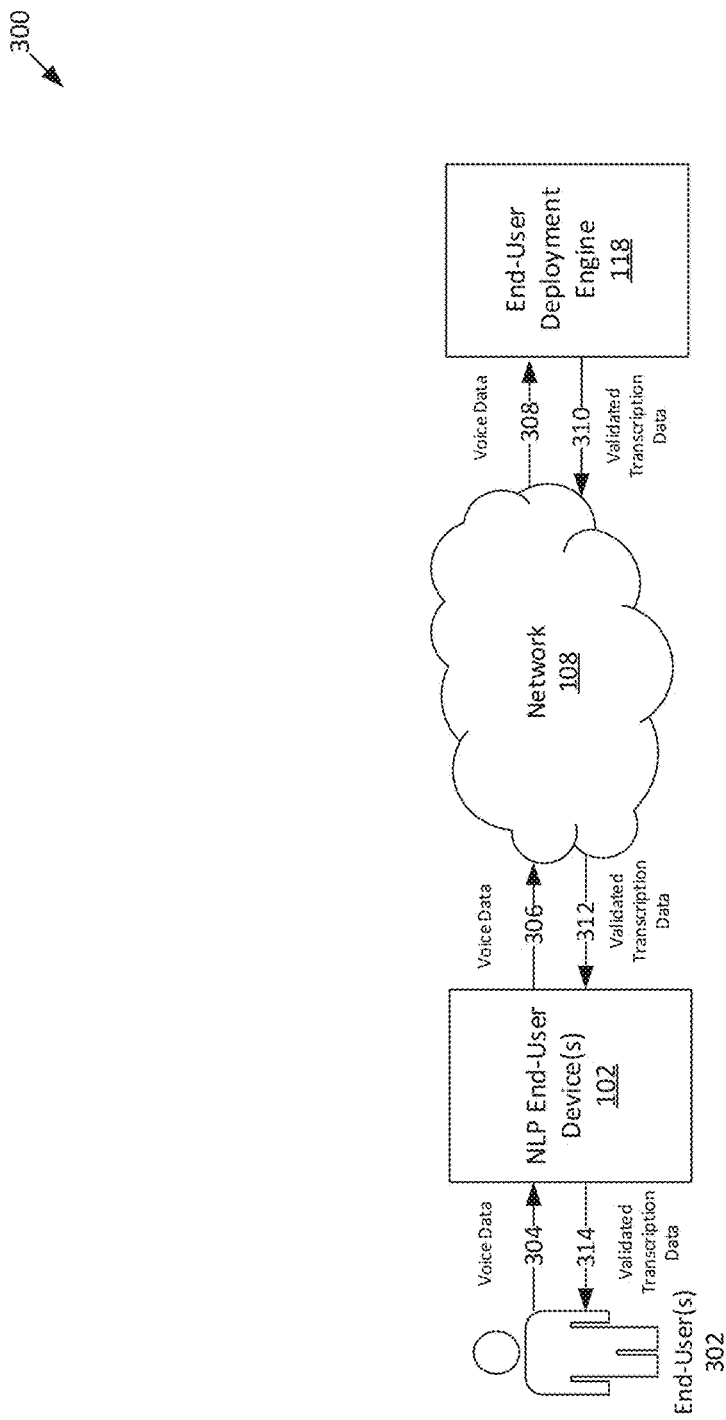
FIG. 3 illustrates a block diagram of an example of a data flow relating to operation of the natural language processing environment during the end-user deployment phase, according to some implementations.

FIG. 3 illustrates a block diagram of an example of a data flow 300 relating to operation of the natural language processing environment 100 during the end-user deployment phase, according to some implementations. FIG. 3 includes end-user(s) 302, the NLP end-user device 102, the network 108, and the end-user deployment engine 118.

At an operation 304, the end-user(s) 302 provide voice data to the NLP end-user device(s) 102. The NLP end-user device(s) 102 may capture the voice data using an audio input device thereon. The NLP end-user device(s) 102 may incorporate the voice data into network-compatible data transmissions, and at an operation 306, may send the network-compatible data transmissions to the network 108.

At an operation 308, the end-user deployment engine 118 may receive the network-compatible data transmissions. The end-user deployment engine 118 may further extract and transcribe the voice data using trained transcription libraries stored in the end-user deployment engine 118. More specifically, the end-user deployment engine 118 may identify validated transcription data corresponding to the voice data in trained transcription libraries. The end-user deployment engine 118 may incorporate the validated transcription data into network-compatible data transmissions. At an operation 310, the end-user deployment engine 118 may provide the validated transcription data to the network 108.

At an operation 312, the NLP end-user device(s) 102 may receive the validated transcription data. The NLP end-user device(s) 102 may further extract the validated transcription data from the network-compatible transmissions. At an operation 314, the NLP end-user device(s) 102 provide the validated transcription data to the end-user(s) 302. In some implementations, the NLP end-user device(s) 102 display the validated transcription data on a display component (e.g., a screen). The NLP end-user device(s) 302 may also use the validated transcription data internally (e.g., in place of keyboard input for a specific function or in a specific application/document).

Operation when Gathering Transcription Data in a Training Phase

The natural language processing environment 100 may operate to gather voice data from NLP trainers during a training phase. More particularly, in a training phase, NLP trainers provide the NLP training device(s) 104 with voice data. The voice data may comprise words, syllables, and/or combinations of words and/or syllables that are commonly appear in a particular language. In some implementations, the NLP trainers use a mobile application on the NLP training device(s) 104 to input the voice data. In the training phase, the NLP training device(s) 104 may provide the voice data to the transcription engine 114. The transcription engine may provide the voice data to the transcription device(s) 106. In some implementations, the transcription engine provides the voice data as part of crowdsourced transcription jobs to transcribers. Transcribers may use the transcription device(s) 106 to perform these crowdsourced transcription jobs. The transcription device(s) 106 may provide the transcription data to the transcription engine 114. In various implementations, the transcription data is validated and/or used in an end-user deployment phase, using the techniques described herein.

Figure 4:
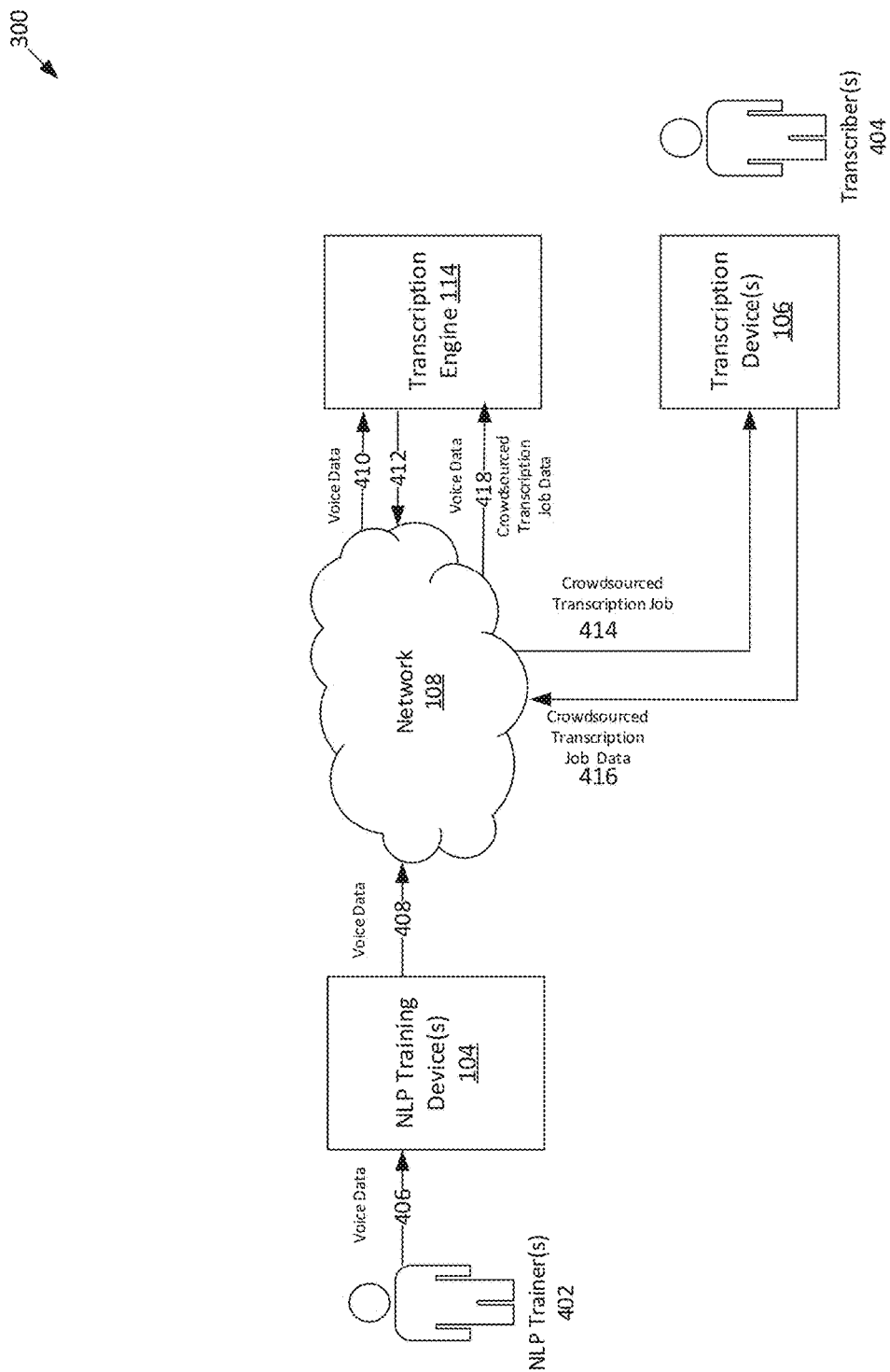
FIG. 4 illustrates a block diagram of an example of a data flow relating to transcription of voice data by the natural language processing environment during the training phase, according to some implementations.

FIG. 4 illustrates a block diagram of an example of a data flow 400 relating to transcription of voice data by the natural language processing environment 100 during the training phase, according to some implementations. FIG. 4 includes NLP trainer(s) 402, the NLP training device(s) 104, the network 108, the transcription engine 114, the transcription device(s) 106, and transcriber(s) 404.

At an operation 406, the NLP trainer(s) 402 provide voice data to the NLP training device(s) 104. The NLP training device(s) 104 may capture the voice data using an audio input device thereon. A first mobile application may facilitate capture of the voice data. The NLP training device(s) 104 may incorporate the voice data into network-compatible data transmissions, and at an operation 408, may send the network-compatible data transmissions to the network 108. In some implementations, the NLP trainer(s) 402 receive compensation (inducements, incentives, payments, etc.) for voice data provided into the first mobile application.

At an operation 410, the transcription engine 114 may receive the network-compatible data transmissions. The transcription engine 114 may incorporate the crowdsourced transcription jobs into network-compatible data transmissions, and at an operation 412, may send the network-compatible data transmissions to the network 108.

At an operation 414, the transcription device(s) 106 may receive the network-compatible data transmissions from the network 108. The transcription device(s) 106 may play the voice data to the transcriber(s) 404 on a second mobile application. In an implementation, the transcription device(s) 106 play an audio recording of the voice data and ask the transcriber(s) 404 to return text corresponding to the voice data. The transcription device(s) 106 may incorporate the text into crowdsourced transcription job data that is incorporate into network compatible data transmissions, which in turn is sent, at operation 416, to the network 108. In some implementations, the transcriber(s) 404 receive compensation (inducements, incentives, payments, etc.) for transcribing voice data.

At an operation 418, the transcription engine 114 receive the network-compatible transmissions. The transcription engine 114 may extract crowdsourced transcription job data from the network-compatible transmissions and may store the voice data and the text corresponding to the voice data as unvalidated transcription data. In various implementations, the unvalidated transcription data is validated by crowdsourced validation jobs as discussed herein.

Operation when Validating Transcription Data in a Training Phase

The natural language processing environment 100 may operate to validate crowdsourced transcription data obtained from transcribers during a training phase. More specifically, the validation engine 116 may identify specific transcribers to perform crowdsourced validation jobs. The validation engine 116 may further funnel the transcribers to a mobile application used to perform validations, either by directing the transcribers to an installation process or to validation modules of the mobile application. In various implementations, the validation engine 116 groups validators and selects groups of validators for the crowdsourced transcription processes, e.g., using a voting classification algorithm. After receiving crowdsourced validation job data, such as: providing the crowdsourced validation job data to additional groups of validation device(s) 110, disqualifying and/or discounting votes from specific validators, storing the crowdsourced validation job data in a transcription library to be used for an end-user deployment phase, compensating validators, etc.

Figure 5:
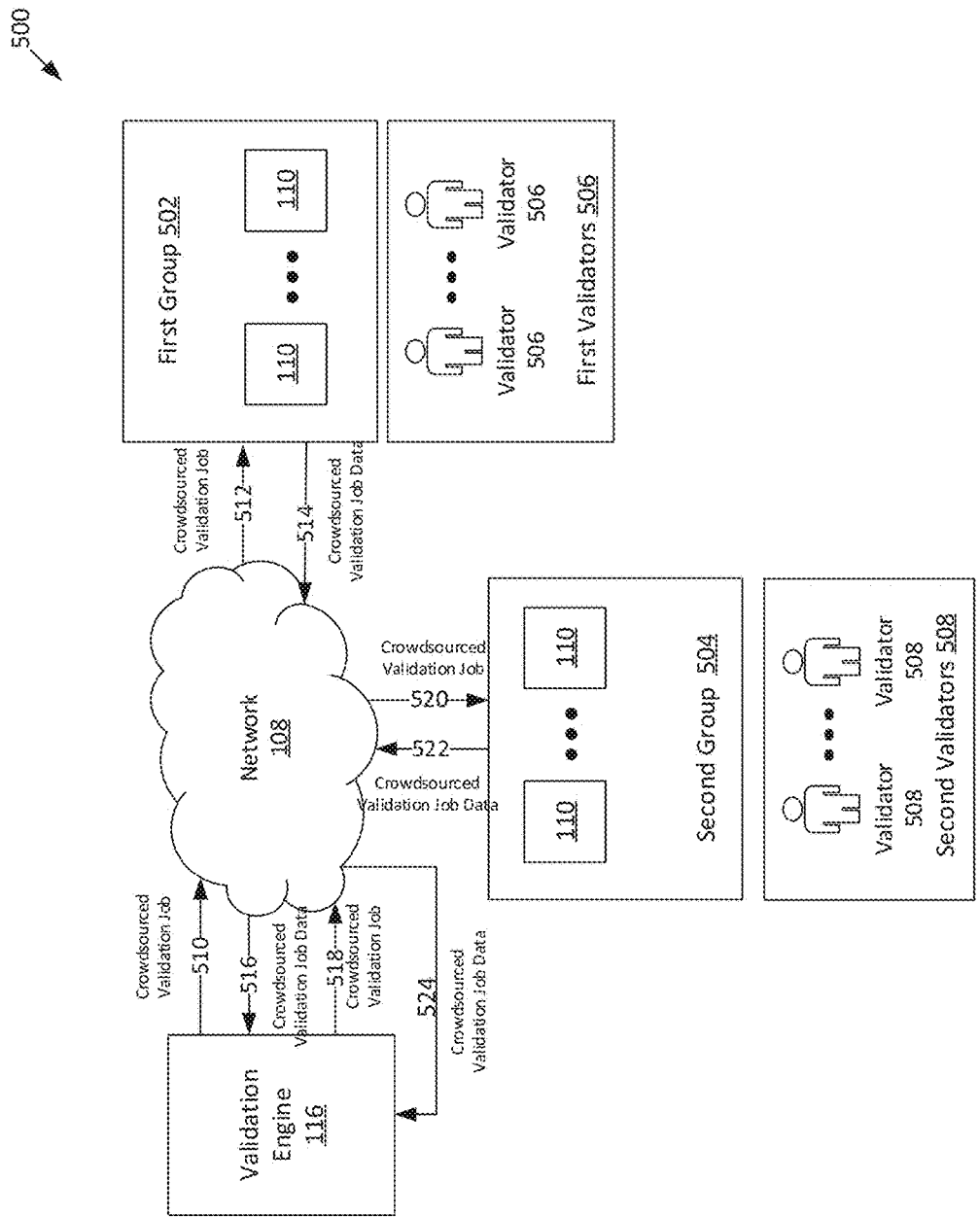
FIG. 5 illustrates a block diagram of an example of a data flow relating to validation of crowdsourced transcription data by the natural language processing environment 100 during the training phase, according to some implementations.

FIG. 5 illustrates a block diagram of an example of a data flow 500 relating to validation of crowdsourced transcription data by the natural language processing environment 100 during the training phase, according to some implementations. FIG. 5 includes the validation engine 116, the network 108, a first group 502 of the validation device(a) 110, a second group 504 of the validation device(s) 110, first validators 506, and second validators 508.

In some implementations, the validation engine 116 identifies validators. In various implementations, the validation engine 116 funnels transcribers to the validation platform using inducements, incentives, etc. in a mobile application used by transcribers. Transcribers may navigate to a portion of the mobile application dedicated to fulfilling crowdsourced validation jobs and/or a separate mobile application dedicated to fulfilling crowdsourced validation jobs. Validators may be identified based on account information, behavior characteristics, etc.

The validation engine 116 may further identify crowdsourced validation jobs for validation. In some implementations, the validation engine 116 gathers voice data and text corresponding to the voice data. The text may have been generated using the crowdsourced transcription processes described further herein. The crowdsourced validation jobs may identify groups of validation device(s) 110. In an implementation, the validation engine 116 uses a voting classification algorithm to identify the first group 502 of the validation device(s) 110. The crowdsourced validation job may be incorporated into a network-compatible transmissions.

At an operation 510, the validation engine 116 may provide the network-compatible transmissions to the network 108. At an operation 512, the first group 502 of the validation device(s) 110 may receive the network-compatible transmissions. The first group 502 of the validation device(s) 110 may extract voice data and text in the network-compatible transmissions and provide the first validators 506 with a prompt that shows the text and the voice data alongside one another. The prompt may further ask the first validators 506 whether or not the text accurately represents the voice data. The first group 502 of the validation device(s) 110 may receive first crowdsourced validation job data that includes votes from the first validators 506, and, at an operation 514, may provide the network 108 with network-compatible transmissions that include the first crowdsourced validation job data.

At an operation 516, the validation engine 116 may receive the network-compatible transmissions. The validation engine 116 may extract the first crowdsourced validation job data, and may apply the first crowdsourced validation job data to the voting classification algorithm. More specifically, the validation engine 116 may classify the first crowdsourced validation job data based on the voting classification algorithm. The validation engine 116 may further determine whether or not to provide the crowdsourced validation job to the second group 504 of the validation device(s) 110.

In some implementations, the voting classification algorithm may require the validation engine 116 to provide the crowdsourced validation job to the second group 504 of the validation device(s) 110. The validation engine 116 may incorporate the crowdsourced validation job into a network-compatible transmissions that, at an operation 518, is provided to the network 108. At an operation 520, the second group 504 of the validation device(s) 110 may receive the network-compatible transmissions. The second group 504 of the validation device(s) 110 may extract voice data and text in the network-compatible transmissions and provide the second validators 508 with a prompt that shows the text and the voice data alongside one another. The prompt may further ask the second validators 508 whether or not the text accurately represents the voice data. The second group 504 of the validation device(s) 110 may receive second crowdsourced validation job data that includes votes from the second validators 508, and, at an operation 522, may provide the network 108 with network-compatible transmissions that include the second crowdsourced validation job data.

At an operation 524, the validation engine 116 may receive the network-compatible transmissions. The validation engine 116 may extract the second crowdsourced validation job data, and may apply the second crowdsourced validation job data to the voting classification algorithm. More specifically, the validation engine 116 may classify the second crowdsourced validation job data based on the voting classification algorithm. The validation engine 116 may also determine whether or not to assign confidence scores to one or more of the first validators 506 and/or one or more of the second validators 508. The validation engine 116 may also compensate (e.g., by providing tokens, etc.) the one or more of the first validators 506 and/or one or more of the second validators 508 for successful validations.

Figure 6:
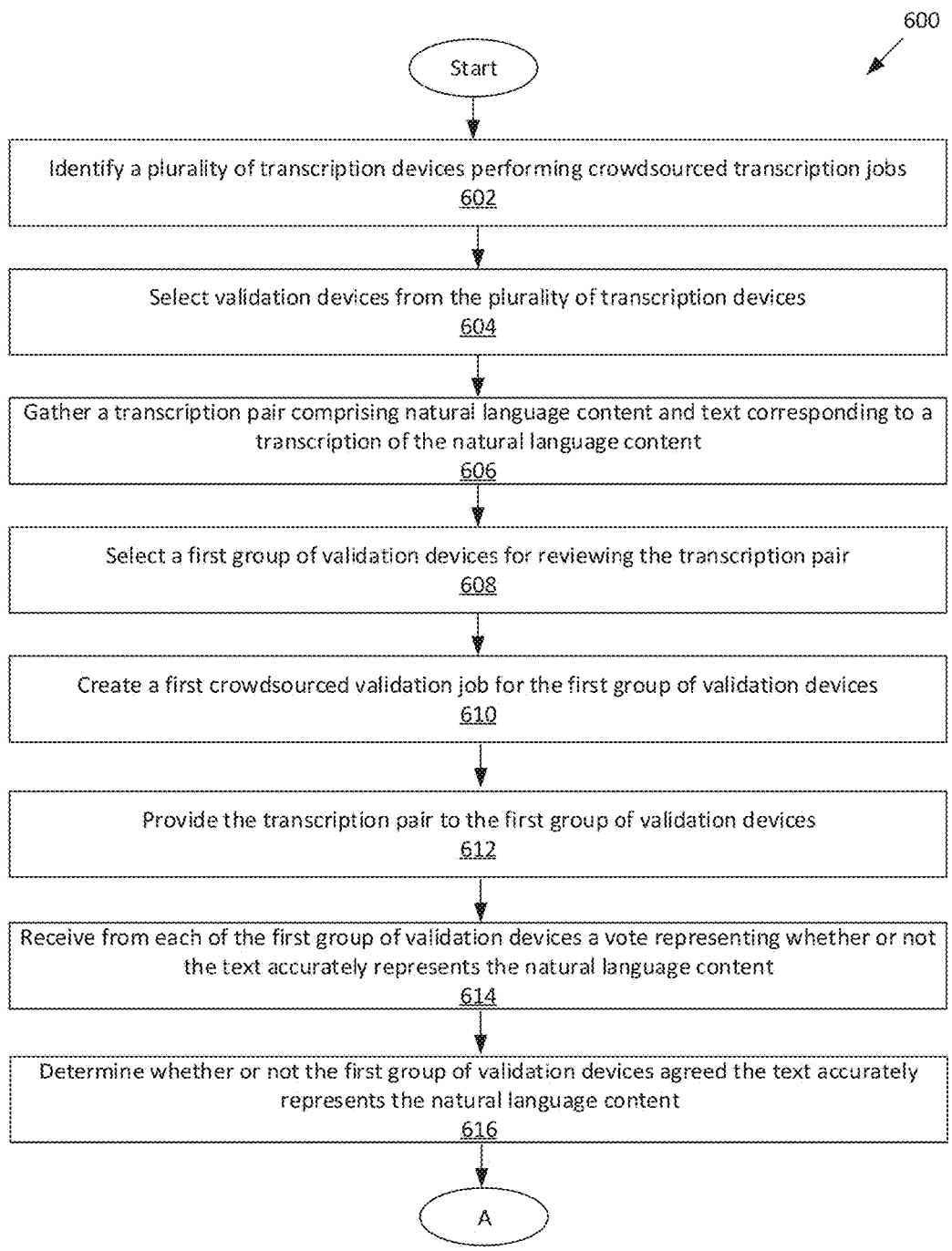
FIG. 6 illustrates a flowchart of a process for selecting validation devices for validating transcriptions of natural language content, according to some implementations.

FIG. 6 illustrates a flowchart of a process 600 for selecting validation devices for validating transcriptions of natural language content, according to some implementations. The various processing operations and/or data flows depicted in FIG. 6 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

At an operation 602, a plurality of transcription devices for performing crowdsourced transcription jobs are identified. In various implementations, the validator selection engine 210 selects user accounts of transcribers and/or mobile application users from the application account data datastore 214.

At an operation 604, the validator selection engine 210 selects validation devices from the plurality of transcription devices. The validator selection engine 210 may provide the mobile application management engine 204 with specific instructions to funnel transcribers away from crowdsourced transcription jobs toward crowdsourced validation jobs.

At an operation 606, a transcription pair comprising natural language content and text corresponding to a transcription of the natural language content is gathered. The validation job management engine 208 may identify and gather a transcription pair comprising voice data and text corresponding to the voice data from the unvalidated transcription data datastore 216.

At an operation 608, a first group of validation devices for reviewing the transcription pair is selected. The validation job management engine 208 may determine which validators are able to review the transcription pair. In some implementations, the validation job management engine 208 determines whether specific validation device(s) 110 have open sessions and/or other indicators of availability for validating the transcription pair.

At an operation 610, a first crowdsourced validation job for the first group of validation devices is created. The validation job management engine 208 may create the first crowdsourced validation job using the transcription pair. The first crowdsourced validation job may include instructions for the first group of validation device(s) 110 to review the transcription pair and vote whether or not the text in the transcription pair is an accurate representation of the voice data in the transcription pair.

At an operation 612, the transcription pair is provided to the first group of validation devices. The validation job management engine 208 may provide the first crowdsourced validation job over the network 108 using, e.g., the network interface engine 202.

At an operation 614, a vote representing whether or not the text accurately represents the natural language content is received from each of the first group of validation devices. More specifically, the validation job management engine 208 may receive a vote representing whether or not the text accurately represents the voice data from the first group of the validation device(s) 110.

At an operation 616, it is determined whether or not the first group of validation devices agreed the text accurately represents the natural language content. In various implementations, the validation job management engine 208 may provide the votes to the validation device classification engine 212. The validation device classification engine 212 may evaluate the votes in accordance with a voting classification algorithm. The validation device classification engine 212 may classify whether or not to provide the transcription pair to additional validation device(s) 110. The process 600 may continue to point A.

Figure 7:
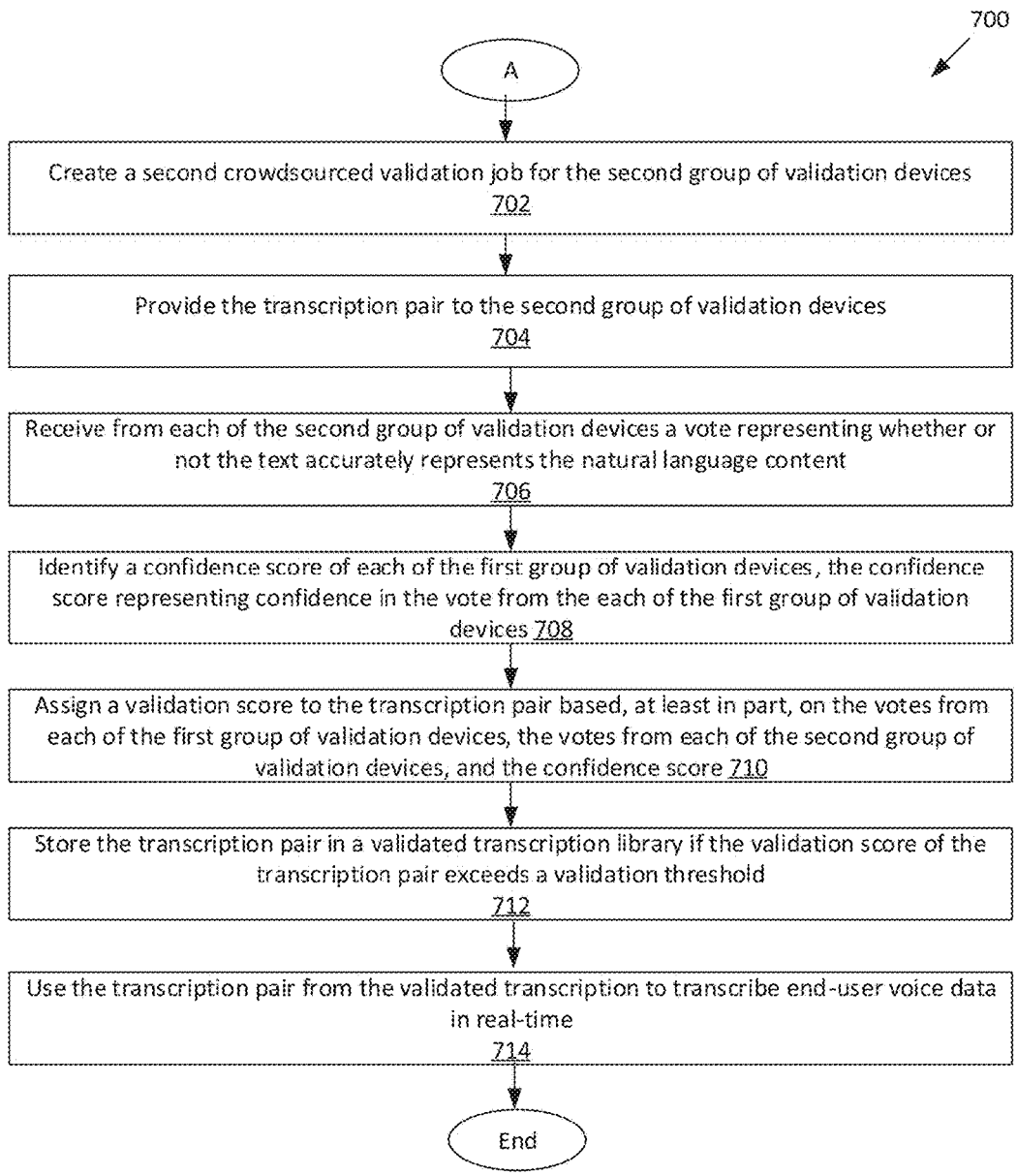
FIG. 7 illustrates a flowchart of a process for selecting validation devices for validating transcriptions of natural language content, according to some implementations.

FIG. 7 illustrates a flowchart of a process for selecting validation devices for validating transcriptions of natural language content, according to some implementations. The various processing operations and/or data flows depicted in FIG. 7 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. The process 700 may begin at point A.

At an operation 702, a second crowdsourced validation job for the second group of validation devices is created. The validation job management engine 208 may create the second crowdsourced validation job using the transcription pair. The second crowdsourced validation job may include instructions for the second group of validation device(s) 110 to review the transcription pair and vote whether or not the text in the transcription pair is an accurate representation of the voice data in the transcription pair.

At an operation 704, the transcription pair is provided to the second group of validation devices. The validation job management engine 208 may provide the second crowdsourced validation job over the network 108 using, e.g., the network interface engine 202.

At an operation 706, a vote representing whether or not the text accurately represents the natural language content is received from each of the second group of validation devices. More specifically, the validation job management engine 208 may receive a vote representing whether or not the text accurately represents the voice data form the second group of the validation device(s) 110.

At an operation 708, a confidence score of each of the first group of validation devices, the confidence score representing confidence in the vote from the each of the first group of validation devices is identified. The validator confidence scoring engine 210 may calculate confidence in validator outcomes using the techniques described herein.

At an operation 710, a validation score to the transcription pair based, at least in part, on the votes from each of the first group of validation devices, the votes from each of the second group of validation devices, and the confidence score is assigned. The validation job management engine 208 may calculate a validation score to the transcription pair based, at least in part, on the votes from each of the first group of validation devices, the votes from each of the second group of validation devices, and the confidence score is assigned.

At an operation 712, the transcription pair is stored in a validated transcription library if the validation score of the transcription pair exceeds a validation threshold. More specifically, the validation job management engine 208 may store the transcription pair in the evaluated transcription data datastore 222.

At an operation 714, the transcription pair from the validated transcription is used to transcribe end-user voice data in real-time. In some implementations, the end-user deployment engine 118 may use the transcription pair from the validated transcription is used to transcribe end-user voice data from the NLP end-user device(s) 102 in real-time.

Figure 8:
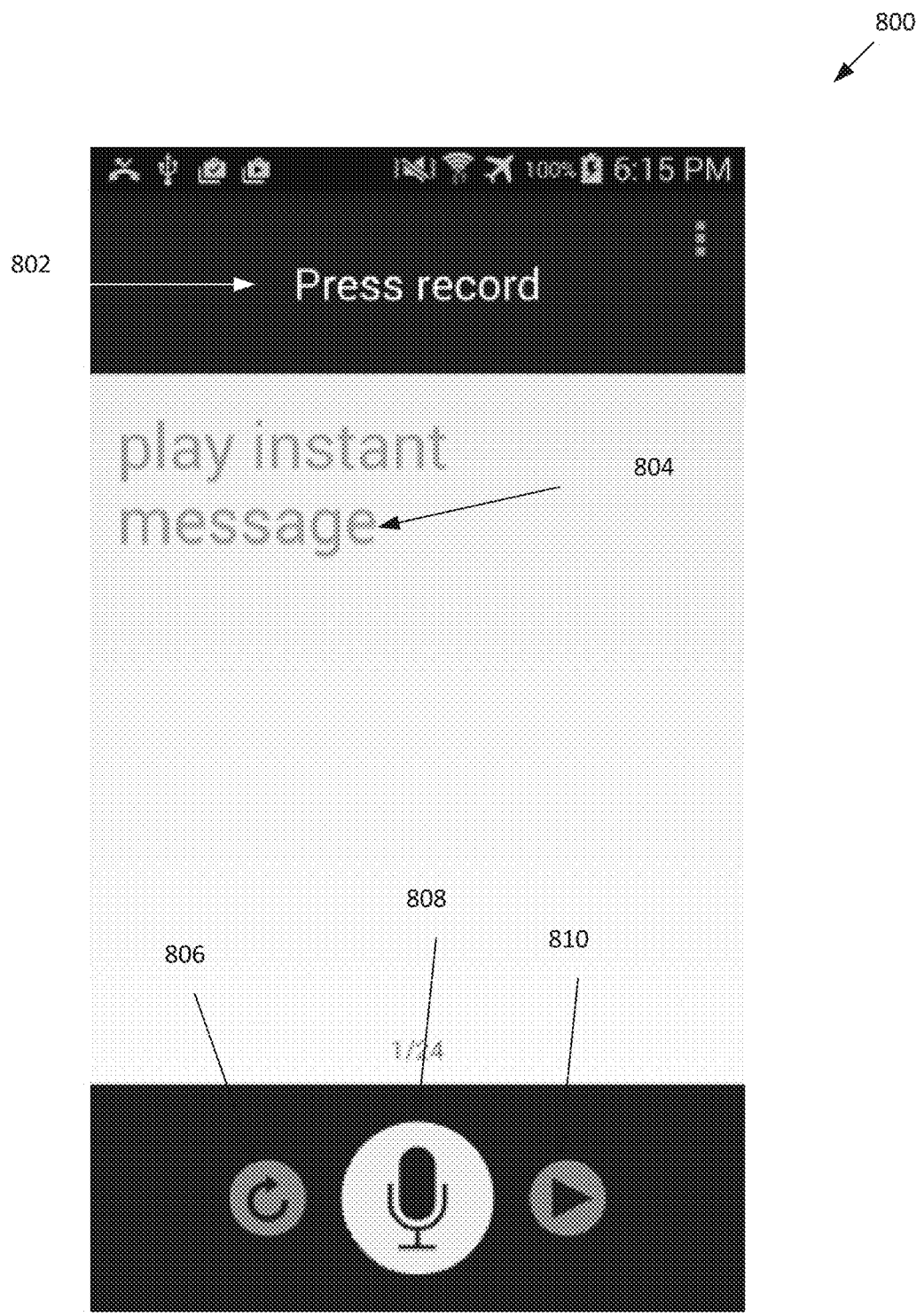
FIG. 8 illustrates a screenshot of a screen of a mobile application of a NLP end-user device used to capture voice data, according to some implementations.

FIG. 8 illustrates a screenshot 800 of a screen of a mobile application of one of the NLP training device(s) 104, according to some implementations. The screen in FIG. 8 may include a recording banner 802, a display area 804, an erase button 806, a record button 808, and a play button 810. In various implementations, the recording banner 802 and the display area 804 may display one or more predetermined prompts to an NLP trainer during a training phase of the natural language processing environment 100. The erase button 806 may allow the NLP trainer to erase voice data that the NLP trainer has previously recorded. The record button 808 may allow the NLP trainer to record voice data. The play button 810 may allow the NLP trainer to play voice that that the NLP trainer has recorded.

In some implementations, the screen in FIG. 8 is provided to an NLP trainer as part of a training phase of the natural language processing environment 100. More specifically, when an NLP trainer logs into the mobile application, the NLP trainer may receive a unique token than is mapped to a specific collection of prompts and audits to be used. Upon entering a token, the NLP trainer may be guided through an arbitrary number of prompts. The NLP training device(s) 104 may provide the voice data to the transcription engine 114 using the techniques described herein. In some implementations, the NLP trainer may be provided with one or more audits (e.g., gold standard questions, captions that are not machine-readable, audio that is not understandable to machines, etc.). Upon completing a session, the NLP trainer may be provided with a completion code (e.g., a 9 character completion code).

Figure 9:
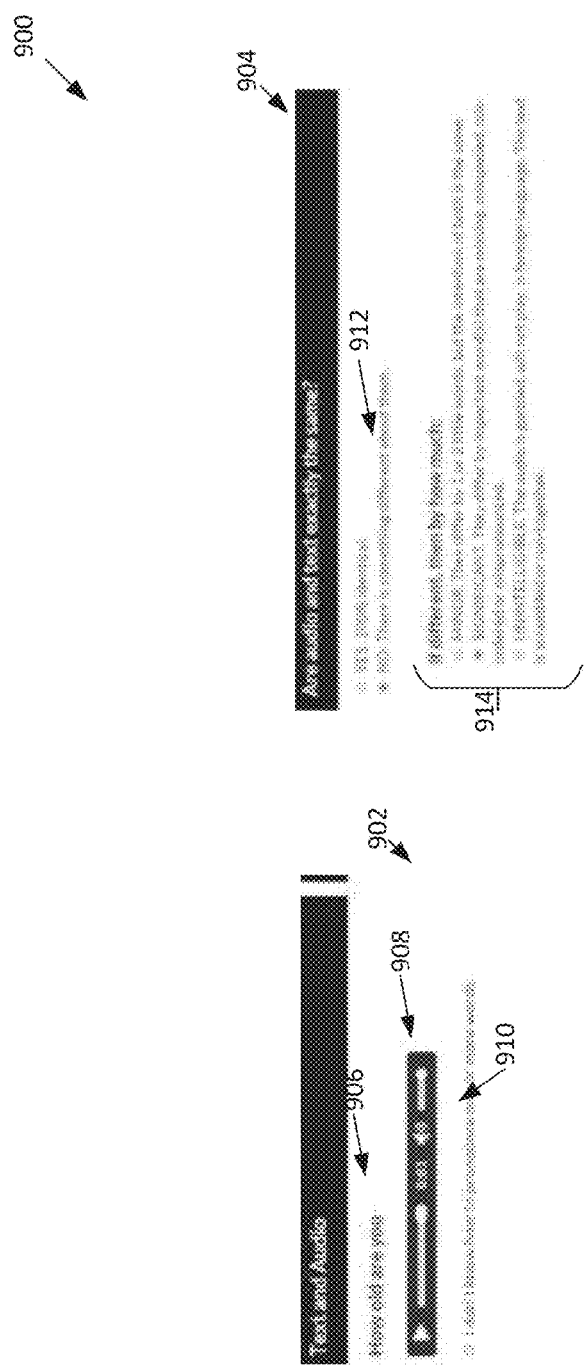
FIG. 9 illustrates a screenshot of a screens of a mobile application of a validation device, according to some implementations.

FIG. 9 illustrates a screenshot 900 of a screens of a mobile application of one of the validation device(s) 110, according to some implementations. The screenshot 900 comprises a first area 902 and a second area 904. The first area 902 may include a text region 906, a voice data region 908, and a help region 910. The text region 906 and the voice data region 908 may provide a validator with voice data and text corresponding to the voice data. The text region 906 and the voice data region 908 may be associated with a crowd-sourced validation job for the validator. The second area 904 may include a first survey region 912 and a second survey region 914.

In various implementations, the screen in FIG. 9 is provided to a validator as part of a training phase of the natural language processing environment 100. The voice data region 908 may provide an audio file of previously recorded voice data. The text region 906 may display text corresponding to the voice data. The help region 910 may allow the validator to explain whether or not the validator is able to complete the task. The first survey region 912 may allow the validator to vote on whether the text in the text region 906 is an accurate representation of the voice data in the voice data region 908. The second survey region 914 may allow the validator to specify how different the text is from the voice data. In some implementations, the first survey region 912 is used as the basis of a vote by the validator, while the second survey region 914 is used merely to ensure the validator is engaged with the validation task.

Figure 10:
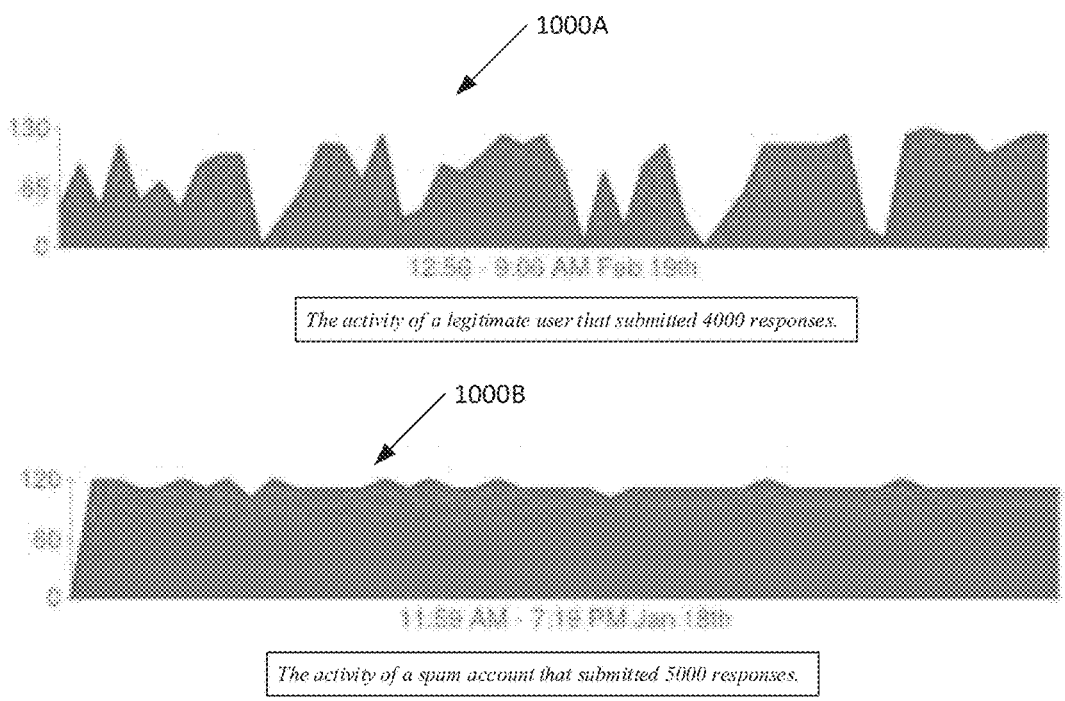
FIG. 10 illustrates two graphs showing the effect of validating natural language content on reducing noise, according to some implementations.

FIG. 10 illustrates a first graph 1000A and a second graph 1000B showing the effect of intentionally introduced errors on transcription processes. The first graph 1000A shows human activity; the activity is not uniform over time as the human being may have taken breaks. The second graph 1000B shows the activity of a spam-bot. This activity is more uniform and resembles a flat line. In this example, the spam-bot took seven hours to complete its tasks and had no significant variation in activity within that timeframe.

Figure 11:
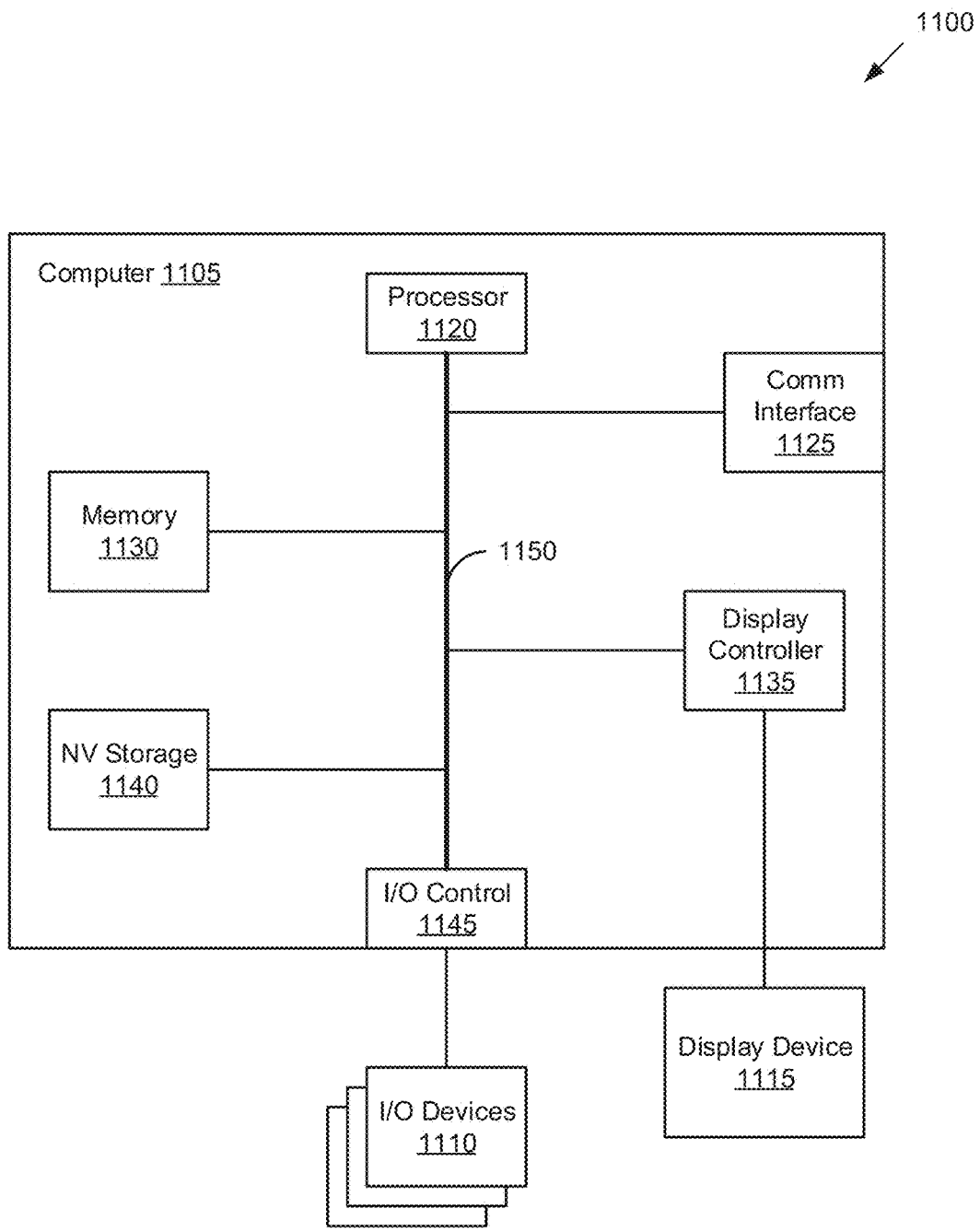
FIG. 11 illustrates an example of a computer system, according to some implementations.

FIG. 11 shows an example of a computer system 1100, according to some implementations. In the example of FIG. 11, the computer system 1100 can be a conventional computer system that can be used as a client computer system, such as a wireless client or a workstation, or a server computer system. The computer system 1100 includes a computer 1105, I/O devices 1110, and a display device 1115. The computer 1105 includes a processor 1120, a communications interface 1125, memory 1130, display controller 1135, non-volatile storage 1140, and I/O controller 1145. The computer 1105 can be coupled to or include the I/O devices 1110 and display device 1115.

The computer 1105 interfaces to external systems through the communications interface 1125, which can include a modem or network interface. It will be appreciated that the communications interface 1125 can be considered to be part of the computer system 1100 or a part of the computer 1105. The communications interface 1125 can be an analog modem, ISDN modem, cable modem, token ring interface, satellite transmission interface (e.g. "direct PC"), or other interfaces for coupling a computer system to other computer systems.

The processor 1120 can be, for example, a conventional microprocessor such as an Intel Pentium microprocessor or Motorola power PC microprocessor. The memory 1130 is coupled to the processor 1120 by a bus 1150. The memory 1130 can be Dynamic Random Access Memory (DRAM) and can also include Static RAM (SRAM). The bus 1150 couples the processor 1120 to the memory 1130, also to the non-volatile storage 1140, to the display controller 1135, and to the I/O controller 1145.

The I/O devices 1110 can include a keyboard, disk drives, printers, a scanner, and other input and output devices, including a mouse or other pointing device. The display controller 1135 can control in the conventional manner a display on the display device 1115, which can be, for example, a cathode ray tube (CRT) or liquid crystal display (LCD). The display controller 1135 and the I/O controller 1145 can be implemented with conventional well known technology.

The non-volatile storage 1140 is often a magnetic hard disk, an optical disk, or another form of storage for large amounts of data. Some of this data is often written, by a direct memory access process, into memory 1130 during execution of software in the computer 1105. One of skill in the art will immediately recognize that the terms "machine-readable medium" or "computer-readable medium" includes any type of storage device that is accessible by the processor 1120 and also encompasses a carrier wave that encodes a data signal.

The computer system 1100 is one example of many possible computer systems which have different architectures. For example, personal computers based on an Intel microprocessor often have multiple buses, one of which can be an I/O bus for the peripherals and one that directly connects the processor 1120 and the memory 1130 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1130 for execution by the processor 1120. A Web TV system, which is known in the art, is also considered to be a computer system, but it can lack some of the features shown in FIG. 11, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein.

What is claimed is:

1. A computer-implemented method, the method being implemented in a computer system having one or more physical processors programmed with computer program instructions that, when executed by the one or more physical processors, program the computer system to perform the method, the method comprising:

obtaining, by the computer system, a transcription pair comprising natural language content and text, wherein the natural language content comprises audio content received from one or more audio input components, and wherein the text corresponds to a transcription of the natural language content;

creating, by the computer system, a first crowdsourced validation job to be performed at one or more first validation devices, the first crowdsourced validation job comprising first instructions for a crowd user to provide an indication of an accuracy of the transcription of the natural language content;

causing, by the computer system, the transcription pair and the first crowdsourced validation job to be provided to the one or more first validation devices;

receiving, by the computer system, at least a first response from at least a first validation device from among the one or more first validation devices, wherein the first response includes a first indication of an accuracy of the transcription of the natural language content; and storing, by the computer system, the transcription pair in a validated transcription library based, at least in part, on the first response.

2. The method of claim 1, further comprising:

assigning, by the computer system, a validation score to the transcription pair based, at least in part, on the first response received from the first validation device with respect to the transcription pair, wherein the transcription pair is stored in the validated transcription library based on the validation score.

3. The method of claim 2, further comprising:

identifying, by the computer system, a confidence score of each of the one or more first validation devices, the confidence score representing confidence in the response from the each of the one or more first validation devices; and updating, by the computer system, the validation score with respect to the transcription pair using the confidence score.

4. The method of claim 2, further comprising storing the transcription pair in the validated transcription library if the validation score of the transcription pair exceeds a validation threshold.

5. The method of claim 1, further comprising:

determining, by the computer system, whether or not the one or more first validation devices agreed the text is an accurate transcription of the natural language content; and determining, by the computer system, whether to provide the transcription pair to one or more second validation devices.

6. The method of claim 5, wherein if the one or more first validation devices did not agree the text is an accurate transcription of the natural language content, the method further comprises:

causing, by the computer system, the transcription pair to be provided to the one or more second validation devices;

receiving, by the computer system, at least a second response from at least a second validation device from among the one or more second validation devices, wherein the second response includes a second indication of an accuracy of the transcription of the natural language content; and storing, by the computer system, the transcription pair in the validated transcription library based, at least in part, on the second response.

7. The method of claim 1, wherein the first instructions configure the one or more first validation devices to provide the natural language content and the text in a survey on a mobile application on the one or more first validation devices.

8. The method of claim 7, wherein the survey includes one or more tasks configured to assist engagement of first validators associated with the one or more first validation devices when responding.

9. The method of claim 7, wherein the survey includes one or more of: test questions, captions that are not machine-readable, and audio that is not understandable to machines.

10. The method of claim 1, further comprising:

identifying, by the computer system, a plurality of transcription devices performing crowdsourced transcription jobs; and selecting, by the computer system, the one or more first validation devices from the plurality of transcription devices.

11. The method of claim 1, wherein the one or more first validation devices is two validation devices.

12. The method of claim 1, further comprising using the transcription pair from the validated transcription library to transcribe end-user voice data in real-time.

13. The method of claim 1, wherein causing the first crowdsourced validation job to be provided to the one or more first validation devices comprises:

causing, by the computer system, the first crowdsourced validation job to be provided to the one or more first validation devices in a validator application.

14. The method of claim 1, wherein causing the first crowdsourced validation job to be provided to the one or more first validation devices comprises:

causing, by the computer system, a message that includes a direct selectable link to an interface to be provided to the one or more first validation devices, wherein the interface includes the first crowdsourced validation job.

15. A system comprising:

one or more physical processors programmed with one or more computer program instructions which, when executed, program the one or more physical processors to:

gather a transcription pair comprising natural language content and text, wherein the natural language content comprises audio content received from one or more audio input components, and wherein the text corresponds to a transcription of the natural language content;

create a first crowdsourced validation job to be performed at one or more first validation devices, the first crowdsourced validation job comprising first instructions for a crowd user to provide an indication of an accuracy of the transcription of the natural language content;

cause the transcription pair and the first crowdsourced validation job to be provided to the one or more first validation devices;

receive at least a first response from at least a first validation device from among the one or more first validation devices, wherein the first response includes a first indication of an accuracy of the transcription of the natural language content; and store the transcription pair in a validated transcription library based, at least in part, on the first response.

16. The system of claim 15, wherein the one or more physical processors are further programmed to:

assign a validation score to the transcription pair based, at least in part, on the first response received from the first validation device with respect to the transcription pair, wherein the transcription pair is stored in the validated transcription library based on the validation score.

17. The system of claim 16, wherein the one or more physical processors are further programmed to:
- identify a confidence score of each of the one or more first validation devices, the confidence score representing confidence in the response from the each of the one or more first validation devices; and
- update the validation score with respect to the transcription pair using the confidence score.

18. The system of claim 16, further comprising storing the transcription pair in the validated transcription library if the validation score of the transcription pair exceeds a validation threshold.

19. The system of claim 15, wherein the one or more physical processors are further programmed to:
- determine whether or not the one or more first validation devices agreed the text is an accurate transcription of the natural language content; and
- determine whether to provide the transcription pair to one or more second validation devices.

20. The system of claim 19, wherein if the one or more first validation devices did not agree the text is an accurate transcription of the natural language content, the one or more processors are further programmed to:
- cause the transcription pair to be provided to the one or more second validation devices;
- receive at least a second response from at least a second validation device from among the one or more second validation devices, wherein the second response includes a second indication of an accuracy of the transcription of the natural language content; and
- store the transcription pair in the validated transcription library based, at least in part, on the second response.

21. The system of claim 15, wherein the first instructions configure the one or more first validation devices to provide the natural language content and the text in a survey on a mobile application on the one or more first validation devices.

22. The system of claim 21, wherein the survey includes one or more tasks configured to assist engagement of first validators associated with the one or more first validation devices when responding.

23. The system of claim 21, wherein the survey includes one or more of: test questions, captions that are not machine-readable, and audio that is not understandable to machines.

24. The system of claim 15, wherein the one or more physical processors are further programmed to:
- identify a plurality of transcription devices performing crowdsourced transcription jobs; and
- select the one or more first validation devices from the plurality of transcription devices.

25. The system of claim 15, wherein the one or more first validation devices is two validation devices.

26. The system of claim 15, further comprising using the transcription pair from the validated transcription library to transcribe end-user voice data in real-time.

27. The system of claim 15, wherein to cause the first crowdsourced validation job to be provided to the one or more first validation devices, the one or more physical processors are further programmed to:
- cause the first crowdsourced validation job to be provided to the one or more first validation devices in a validator application.

28. The system of claim 15, wherein to cause the first crowdsourced validation job to be provided to the one or more first validation devices, the one or more physical processors are further programmed to:
- cause a message that includes a direct selectable link to an interface to be provided to the one or more first validation devices, wherein the interface includes the first crowdsourced validation job.

* * * * *